United States Patent [19]

Kishi

[11] 4,223,362
[45] Sep. 16, 1980

[54] TAPE RECORDING AND/OR REPRODUCING APPARATUS

[75] Inventor: Yoshio Kishi, Hachiouji, Japan

[73] Assignee: Sony Corporation, Tokyo, Japan

[21] Appl. No.: 934,010

[22] Filed: Aug. 16, 1978

[30] Foreign Application Priority Data

Aug. 22, 1977 [JP] Japan .................................. 52-100761

[51] Int. Cl.$^2$ ...................... G11B 15/02; G11B 19/02
[52] U.S. Cl. ..................................... 360/137; 360/61;
360/69; 360/74.1; 360/96.3
[58] Field of Search ....................... 360/73, 74.1, 96.3,
360/96.4, 105, 137; 242/201, 186, 208–209

[56] References Cited

U.S. PATENT DOCUMENTS

| | | | |
|---|---|---|---|
| 3,912,195 | 10/1975 | Yamamoto | 242/201 |
| 3,947,894 | 3/1976 | Chimura | 360/137 |
| 3,976,263 | 8/1976 | Suzuki | 242/209 X |
| 3,997,129 | 12/1976 | Ban et al. | 242/208 X |
| 4,031,556 | 6/1977 | Ban et al. | 360/96.4 |
| 4,131,922 | 12/1978 | Yoshida et al. | 360/105 X |

*Primary Examiner*—John H. Wolff
*Attorney, Agent, or Firm*—Lewis H. Eslinger; Alvin Sinderbrand

[57] ABSTRACT

A mode change-over mechanism for a tape recording and/or reproducing apparatus wherein the operating mode is selected by depressing a selected one of a plurality of push-buttons. The mechanism includes a pair of operating gears and a pair of independently movable operating members. The operating gears are associated with selected ones of plural push-buttons through respective trigger members. Movement of the first operating member in response to depression of a push-button establishes one operating mode for the recorder/reproducer; movement of the second operating member in response to another push-button establishes a second mode; movement of both operating members responsive to a third push-button establishes another mode; and further modes are obtained by movement of the first operating member through plural paths.

16 Claims, 36 Drawing Figures

TAPE RECORDING AND/OR REPRODUCING APPARATUS

BACKGROUND OF THE INVENTION

1. Field of the Invention

This invention relates to tape recording and/or reproducing apparatus, and more particularly is directed to a mode selecting apparatus suitable for use in recording and/or reproducing apparatus.

2. Description of the Prior Art

In one type of conventional tape recorder, the mode selecting operation is accomplished by depressing a selected push-button under the force of the finger of the operator. Accordingly, the operator must push the push-button with force sufficient to actuate the change-over mechanism. This type of push-button assembly has limited operability. In another type of tape recorder the mode selecting operation is accomplished through a plurality of plungers which actuate the change-over mechanism in accordance with the depression of the push-button. But by providing plural plungers such tape recorders becomes complicated and relatively large in size.

In another type of tape recorder, the change-over mechanism is actuated by the electric motor provided in the recorder for driving the tape. According to this type of change-over device, the tape recorder mode is changed by slightly touching the push-button and without providing further driving means. But in devices of this type it is very difficult to establish a plurality of operations through a single motor.

SUMMARY OF THE INVENTION

One object of this invention is to provide a mode change-over apparatus for a tape recording and/or reproducing apparatus which has a high degree of operability.

Another object of this invention is to provide a tape recording and/or reproducing apparatus in which the mode selecting operation is accomplished by the single motor used for driving the tape, and the modes to be selected include cue mode and/or review mode.

A further object of this invention is to provide a mode change-over mechanism for a tape recording and/or reproducing apparatus which has many functions but which is a simple mechanism and of compact size.

A still further object of this invention is to provide a tape recording and/or reproducing apparatus in which a continuous mode changing-over operation can be accomplished quickly, with relative ease and with a high degree of accuracy.

According to the present invention, there is provided a mode change-over mechanism for a tape recording and/or reproducing apparatus which includes a plurality of push-buttons for operating the apparatus to change over to a selected mode of operation. The recorder/reproducer includes a head chassis on which at least a recording head and a reproducing head, or recording-reproducing head is mounted and a tape driving assembly for running the tape either at a predetermined constant speed or at a relatively high speed. The mode change-over mechanism includes a first operating gear associated with at least one of the plural push-buttons through trigger means with the trigger means functioning in response to the depression of one of the push-buttons. A first operating member is associated with the first operating gear to operate the tape driving means into an active state for running the tape at a predetermined constant speed or at a relatively high speed in response to the depression of the one push-button. A second operating gear is associated with at least one of the other push-buttons through another trigger means with the second trigger means functioning in response to the depression of another one of the push-buttons. A second operating member is associated with the second operating gear to operate the head chassis into an intermediate position between the active position and the inactive position relative to the tape running path. The above and other objects, features and advantages of this invention will be more readily apparent from the following detailed description of an illustrative embodiment thereof read in conjunction with the accompanying drawings.

DESCRIPTION OF THE PREFERRED EMBODIMENTS

The present invention will be described with respect to a cassette type tape recorder.

Figure 1:
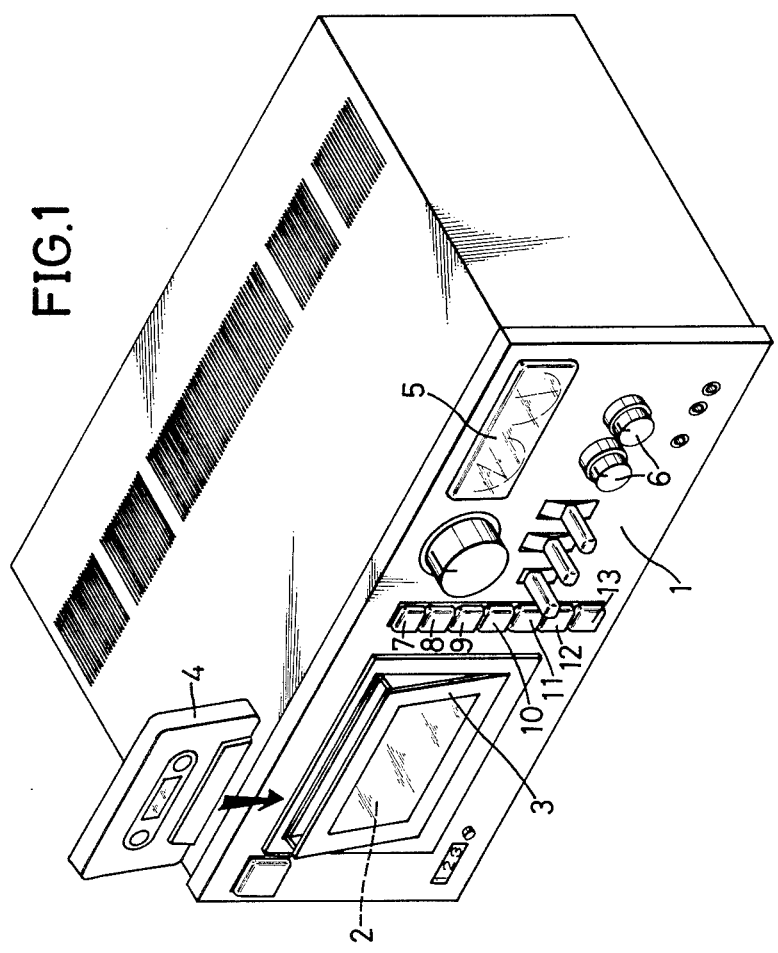
FIG. 1 is a perspective view of a tape recorder according to one embodiment of this invention.

As best seen in FIG. 1, the tape recorder has an operating push-button assembly on a front panel 1 and an opening 2 is defined in the front panel 1 to receive a tape cassette 4. The opening is provided with a door member 3 which comprises a cassette holder. When the tape cassette 4 is inserted into the cassette holder formed on the rear side of door 3, and door 3 is closed, the tape cassette 4 is placed in the operative position of the tape recorder. Also included on panel 1 are electric meters 5 and control knobs 6. The push-button assembly includes a stop button 7, rewind button 8, reproducing-reproducing button 9, reproducing button 10, fast forward button 11, pause button 12 and recording button 13 which are vertically aligned on the front panel 1.

Figure 2:
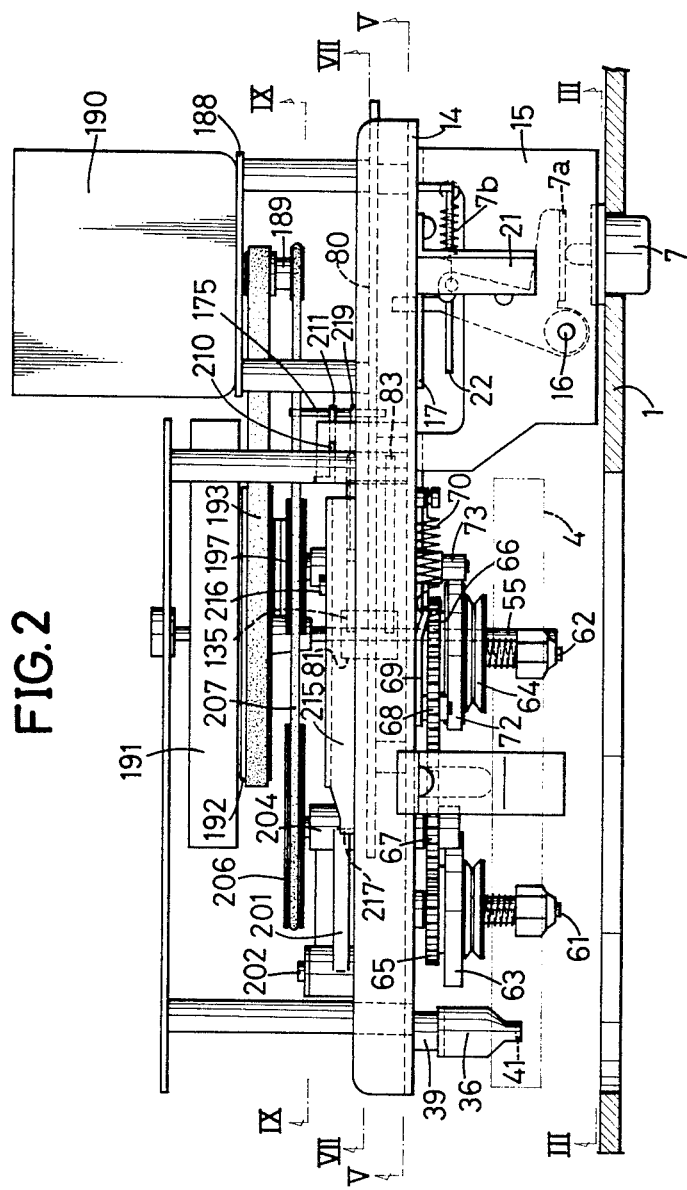
FIG. 2 is a plan view of the tape recorder with a cover removed.
Figure 3:
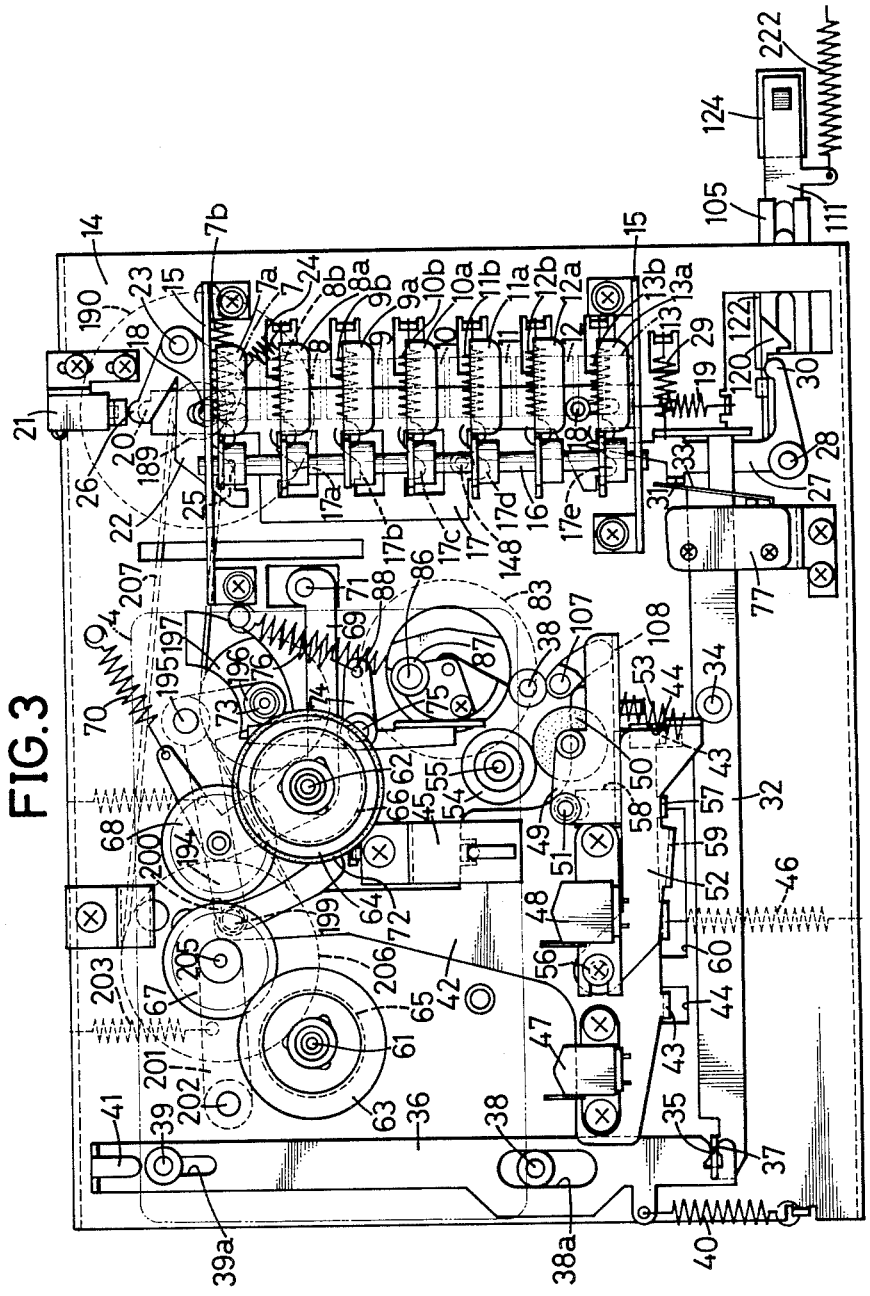
FIG. 3 is an elevational view of the tape recorder taken along the line III—III in FIG. 2.
Figure 4:
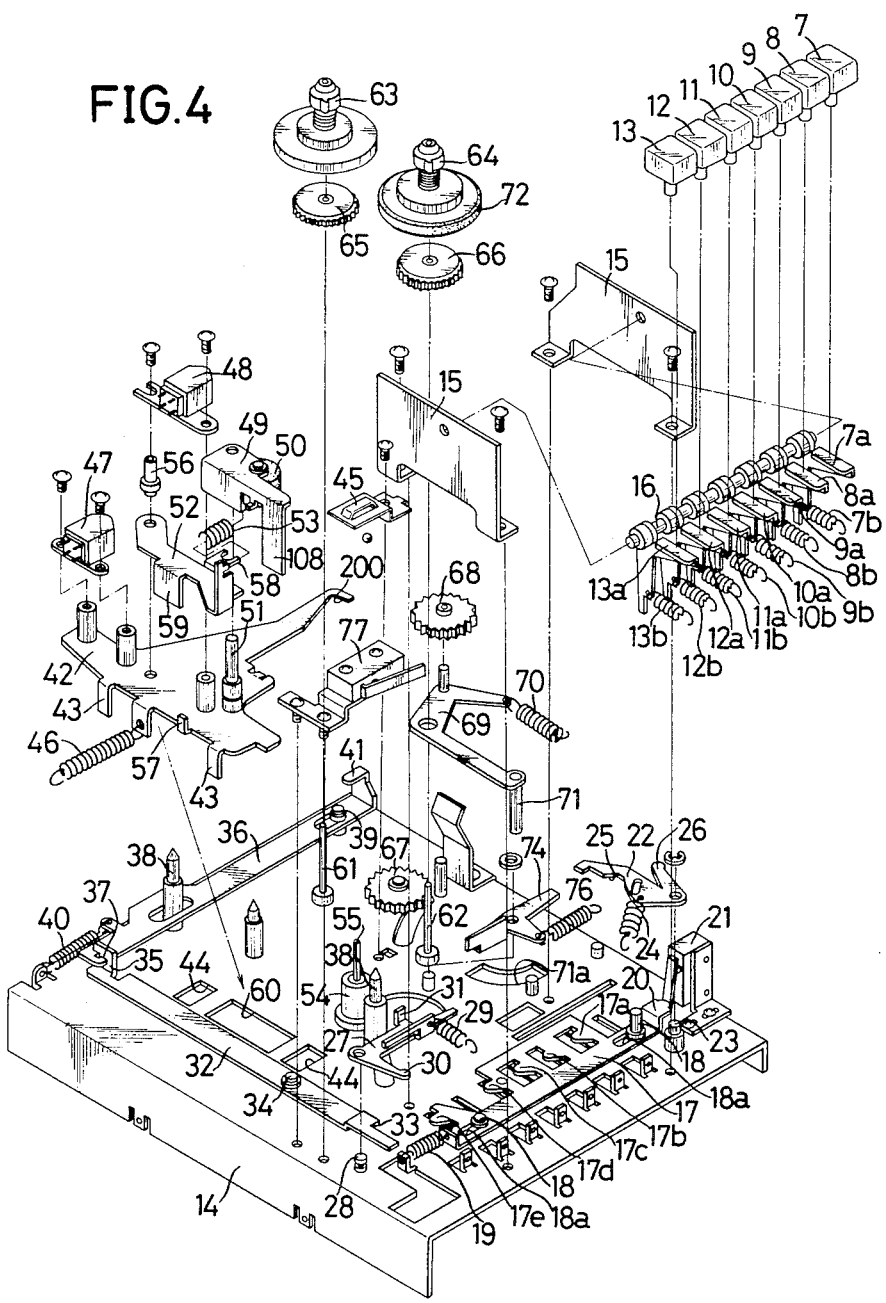
FIG. 4 is an exploded perspective view of the assemblies mounted on the chassis of the tape recorder shown in FIG. 3.

As seen in FIGS. 3 and 4, push-buttons 7 through 13 are respectively associated with L-shaped levers 7a, 8a, 9a, 10a, 11a, 12a and 13a. These levers are rotatably supported by a shaft 16 which is supported at each end by a pair of supporting plates 15 mounted on chassis 14. The chassis 14 is arranged behind and parallel to the front panel 1. L-shaped levers 7a, 8a, 9a, 10a, 11a, 12a and 13a are urged in the clockwise direction around the shaft 16 of FIG. 2 by respective coil springs 7b, 8b, 9b, 10b, 11b, 12b and 13b.

A locking plate 17 is disposed under the push-buttons 7 through 13. Locking plate 17 is slidably supported in the vertical direction as viewed in FIG. 3 on the chassis 14 through a pair of pins 18 which extend from chassis 14 and are retained in elongated slots 18a on plate 17. Locking plate 17 is urged downwardly as viewed in FIG. 3 by a coil spring 19. An actuating portion 20 is formed at the top end of locking plate 17 to push a micro switch 21, as shown in FIG. 3 when plate 17 is in its uppermost position.

Five locking portions 17a, 17b, 17c, 17d and 17e are provided on locking plate 17. These locking portions are nodular shaped protrusions and are engageable with the top ends of L-shaped levers 8a, 9a, 10a, 11a and 13a, respectively, to lock rewind button 8, reproducing-reproducing button 9, reproducing button 10, fast forward button 11 and recording button 10. These lock portions 17a, 17b, 17c, 17d and 17e have respective pockets to receive the top ends of the corresponding L-shaped levers. Among these five pockets, the pocket corresponding to the reproducing-reproducing push-button 9 is shallower than the other pockets, whereby the downward stroke in the locking operation of the reproducing-reproducing push-button 9 is less than those in the locking operations of the other push-buttons.

A stop lever 22 is arranged under the stop push-button 7 and is rotatably supported on a pin 23 mounted on the chassis 14. Lever 22 is urged to rotate counter-clockwise around pin 23 as viewed in FIG. 3 by a coil spring 24. The top end of L-shaped lever 7a is engageable with a slanged face 25 of stop lever 22. That is, L-shaped lever 7a pushes the slanted face 25 of stop lever 22 to rotate stop lever 22 clockwise around pin 23 against the urging force of coil spring 24. Stop lever 22 also includes an actuating portion 26 formed on lever 22 which engages and pushes micro switch 21 when stop push-button 7 is pushed.

The top end of L-shaped lever 13a associated with the recording push-button 13 contacts one end of an L-shaped recording selector 27 which is rotatably supported on chassis 14 by a pin 28 and is urged clockwise, as viewed in FIG. 3, around pin 28 by a coil spring 29. An actuating portion 30 is formed on the other end of the selector 27 and a bent tab 31 is also formed integrally with the selector 27. The bent tab 31 is engageable with an L-shaped cut-out portion 33 formed on one end of a change-over lever 32 which is rotatably supported on chassis 14 by pin 34. An engaging tab 35 is formed on the other end of the lever 32 and is received in a cut-out portion 37 of a detecting slide 36. The slide 36 is slidably supported on chassis 14 for movement in the vertical direction as viewed in FIG. 3 through pins 38 and 39 disposed in elongated slots 38a and 39a in slide 36. The slide 36 is urged downwardly by a coil spring 40. Pin 38 also supports the cassette in the operative position and a detecting portion 41 is formed at the top end of the slide 36 to detect a frangible tab of tape cassette 4.

A head chassis assembly 42 is arranged on chassis 14 and includes a pair of bent tabs 43 formed on head chassis 42. Tabs 43 are received in respective rectangular openings 44 defined on chassis 14. The chassis assembly 42 is pressed by a leaf spring 45 against chassis 14 and head chassis assembly 42 is slidably supported on chassis 14 for movement in the vertical direction as viewed in FIG. 3. Head chassis assembly 42 is also urged downwardly by a coil spring 46. Mounted on head chassis assembly 42 through respective supporting means are an erasing head 47 and a recording-reproducing head 48.

Also supported on head chassis assembly 42 through a pinch roller lever 49 is a pinch roller 50. Pinch roller lever 49 is rotatably supported by a pin 51 mounted on the head chassis 42 and is urged in the counter-clockwise direction as viewed in FIG. 3 around pin 51 by a compression coil spring 53 which is arranged between the pinch roller lever 49 and a pushing lever 52. A capstan 55 is rotatably supported by a radial bearing 54 which is fixed on chassis 14 and faces pinch roller 50. Pushing lever 52 is rotatably supported by a pin 56 which comprises a supporting means for recording-reproducing head 48. Lever 52 is urged in the clockwise direction as viewed in FIG. 3 around pin 56 by compression coil spring 53. However, lever 52 is prevented from rotating in the clockwise direction by a bent portion 57 of head chassis assembly 42. Further, pushing lever 52 includes a tongue 58 which contacts pin 51 to support pinch roller lever 49. A bent tab 59 on pushing lever 52 is received in opening 60 formed on chassis 14 to limit movement of pushing lever 52 with respect to chassis 14.

A pair of shafts 61 and 62 extend from chassis 14 on which are rotatably supported a supply reel mount 63 and a take-up reel mount 64. A pair of gears 65 and 66 are arranged under reel mounts 63 and 64, respectively, and torque to rotate reel mounts 63 and 64 are transmitted by the friction between reel mount 63 and gear 65 and between reel mount 64 and gear 66. Gear 65 is engageable with a drive gear 67, and gear 66 is always in engagement with an idler gear 68 which is rotatably supported on a supporting lever 69 rotatably supported about shaft 62. Supporting lever 69 is urged in the clockwise direction as viewed in FIG. 3 around shaft 62 by a coil spring 70. Lever 69 includes a downwardly projecting pin 71 which is disposed within an arcuate slot 71a in chassis 14.

Reel mount 64 is provided with a rubber ring 72 about its peripheral surface and a friction wheel 73 is disposed to face rubber ring 72. Reel mount 64 is driven when friction wheel 73 contacts rubber ring 72. A change-over lever 74 is also arranged on chassis 14 to control the engagement of friction wheel 63 and reel mount 64. Lever 74 is rotatably supported on chassis 14 through a pin 75 and is urged in the counterclockwise direction as viewed in FIG. 3 by a coil spring 76.

A record detecting switch 77 is also arranged on chassis 14 and is engageable with bent tab 31 of recording selector 27, which is rotated in accordance with the pushing operation of recording push-button 13.

Figure 5:
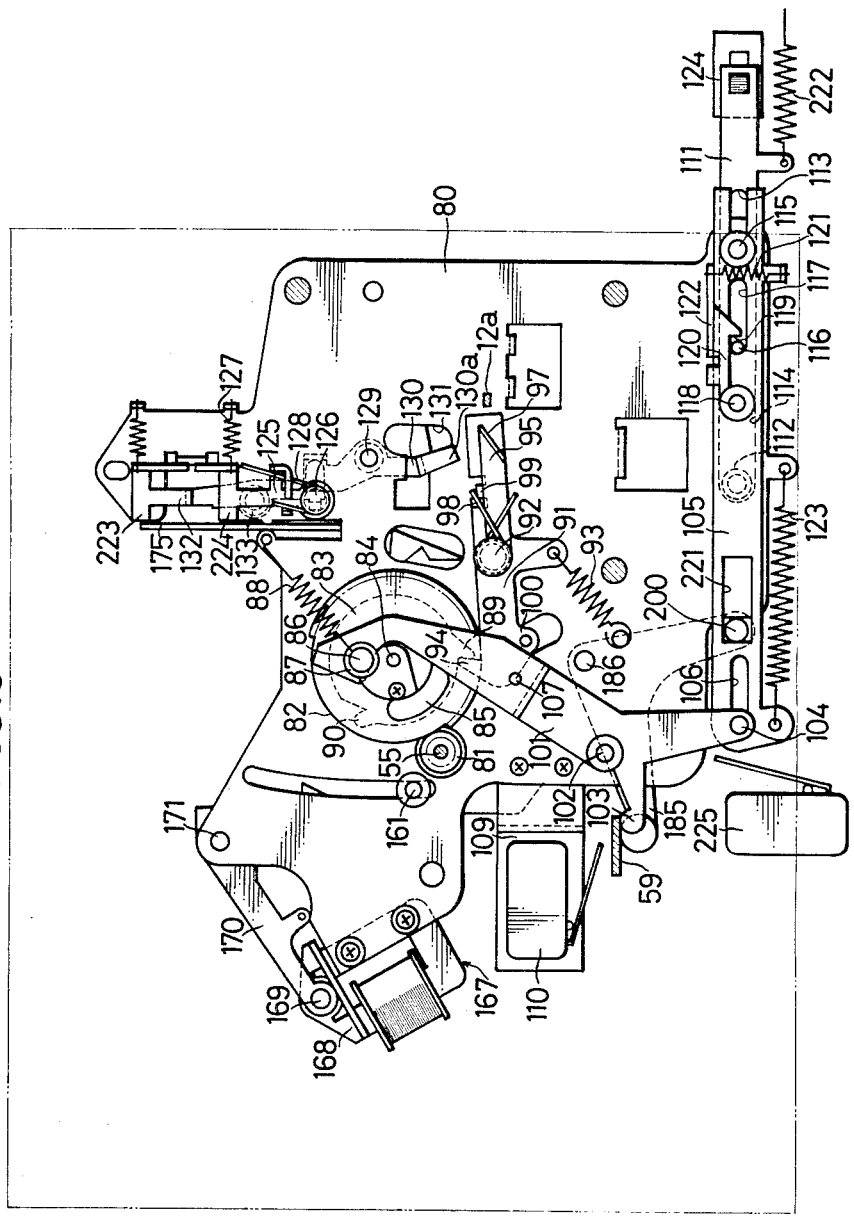
FIG. 5 is an elevational view of the tape recorder taken along the line V—V in FIG. 2.
Figure 6:
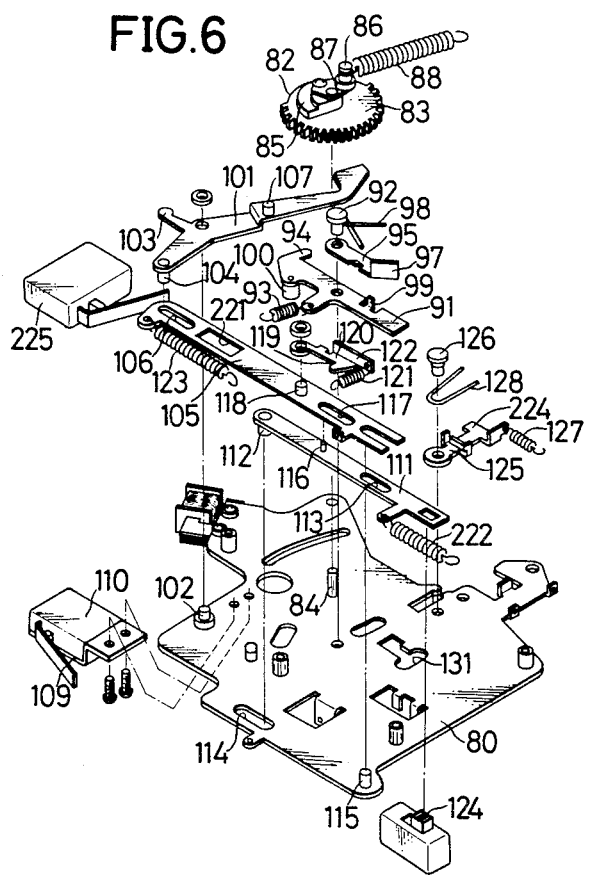
FIG. 6 is an exploded perspective view of the assemblies mounted on the sub-chassis of the tape recorder shown in FIG. 5.

Next, as best seen in FIGS. 5 and 6, there will be described a pause mechanism assembly which is mounted on a sub-chassis 80 arranged behind chassis 14.

A drive gear or a pinion 81 is fixed to the capstan shaft 55 and is arranged to face a pause gear 83. Pause gear 83 is provided with a toothless portion 82 and is rotatably supported on a shaft 84 mounted on chassis 80. The gear 83 has a cam surface 85 and a pin 86 formed on its upper surface (See FIG. 6). A roller member 87 is rotatably supported on pin 86 and one end of a coil spring 88 is engaged about pin 86. A pair of stopper portions 89 and 90 are also formed on lower surface of pause gear 83. The distance from the top of stopper portion 89 to the center of the pause gear is longer than that from the top of stopper portion 90 to the center of the pause gear, and the size of the stopper portion 89 is larger than that of the stopper portion 90.

A pause trigger lever 91 is arranged adjacent the pause gear 83. Pause trigger lever 91 is rotatably supported on the sub-chassis 80 through a pin 92 and is urged in the clockwise direction as viewed in FIG. 5 around pin 92 by a coil spring 93. A hook 94 formed on the top of trigger lever 91 engages with stop portion 89 in the ordinary state, and engages with stop portion 90 in the pause mode of operation. A sub-trigger lever 95 is rotatably supported on trigger lever 91 by a pin 92 and includes an angled portion 97. The angled portion 97 is arranged to contact with a top of L-shaped lever 12a, which is associated with the pause push-button 12. A torsion spring 98 is arranged between trigger lever 91 and sub-trigger lever 95 to urge the latter counter-clockwise as viewed in FIG. 5 around pin 92 relative to trigger lever 91. However, sub-trigger lever 95 is prevented from rotating counter-clockwise by a bent tab 99 which is formed integrally with trigger lever 91. The trigger lever 91 also includes a downwardly projecting pin 100.

A pause lever 101 is also arranged on sub-chassis 80, and is rotatably supported thereon by a pin 102. The upper end of lever 101, as viewed in FIG. 5, contacts cam surface 85 formed on pause gear 83. Pause lever 101 also includes an integral arm 103 to push bent tab 59 of pushing lever 52. Pause lever 101 is also connected to a recording slide 105 through a pin 104 engaged within an oblong opening or slot 106 formed in recording slide 105. A pin 107 is also mounted on pause lever 101 to push an arm 108 of pinch roller lever 49 (FIG. 3). A play detecting switch 110 supported on sub-chassis 80 by a supporting plate 109 is arranged beside pause lever 101.

A reproducing slide 111 is slidably arranged beneath recording slide 105 through a pin 112 mounted on slide 111 which is received in an oblong opening or slot 114 formed on the sub-chassis 80. Slide 111 also includes an oblong opening or slot 113 in which is received a pin 115 extending from sub-chassis 80. In this manner, reproducing slide 111 is slidably supported on sub-chassis 80. In addition, a pin 116 extends from reproducing slide 111 and is received in an oblong opening or slot 117 formed on recording slide 105. Pin 116 is engageable with a shoulder portion 119 of a connecting lever 120 which is connected to the recording slide 105 through a pin 118. A coil spring 121 is extended between connecting lever 120 and recording slide 105 to urge connecting lever 120 in the clockwise direction as viewed in FIG. 5 around pin 118 and relative to recording slide 105. Connecting lever 120 also includes a bent tab 122 which is engageable with the actuating portion 30 of recording selector 27 (FIG. 3). A coil spring 123 is extended between recording slide 105 and sub-chassis 80 to urge recording slide 105 to the right as viewed in FIG. 5. The right end of the reproducing slide 111 is connected to a actuating knob of a recording-reproducing change-over switch 124.

A rewind selector is also rotatably arranged on sub-chassis 80 through a pin 126, and is urged in the clockwise direction as viewed in FIG. 5 around pin 126 by a coil spring 127. The upper end of L-shaped lever 8a pushes a side portion of a rod spring 128 provided on the selector 125 to rotate the selector 125 counter-clockwise against the urging force of coil spring 127 when L-shaped lever 8a is rotated responsive to the depression of rewind push button 8.

Figure 7:
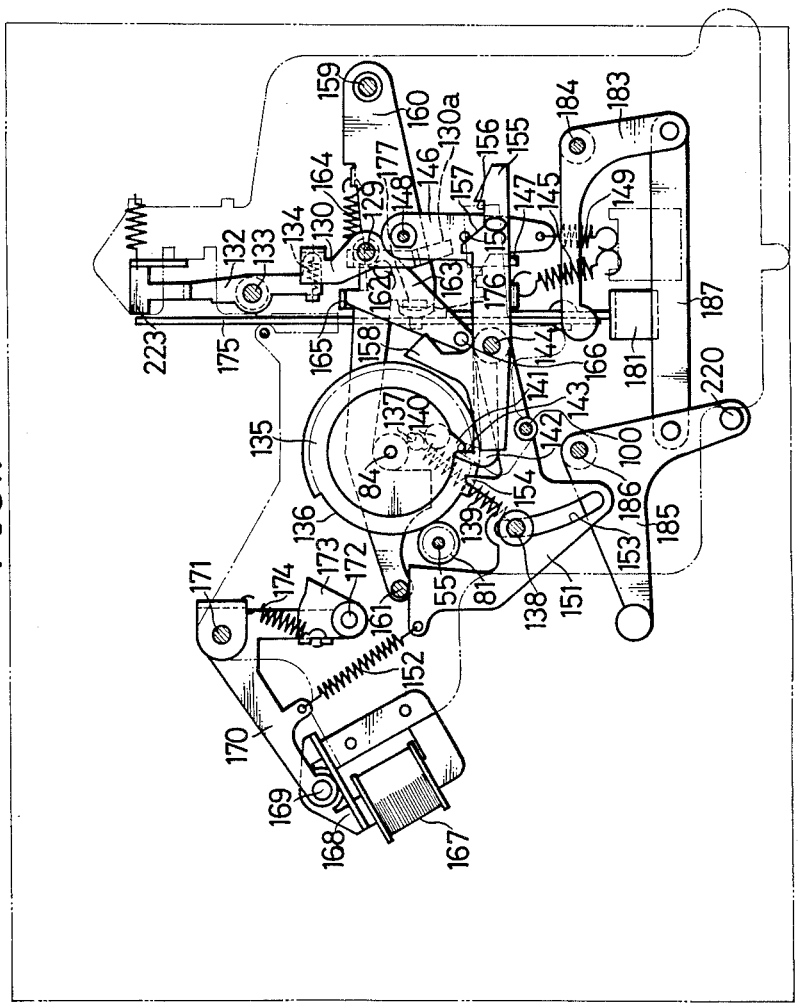
FIG. 7 is an elevational view of the tape recorder taken along the line VII—VII in FIG. 2.
Figure 8:
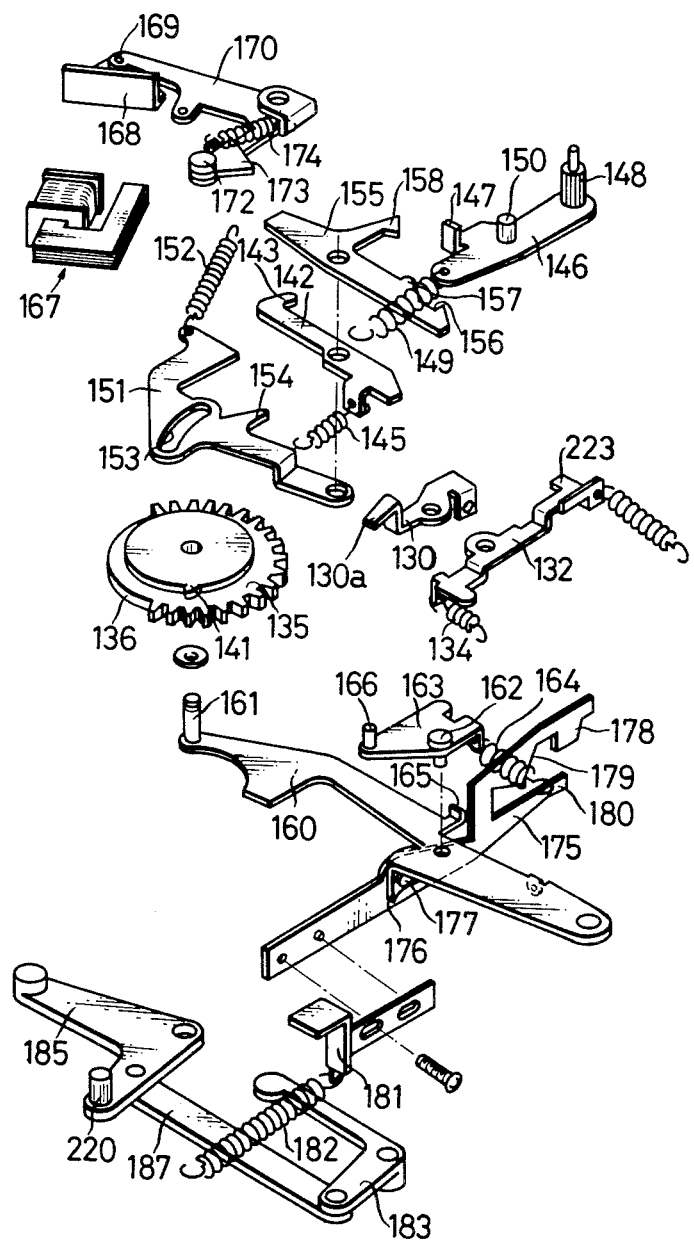
FIG. 8 is an exploded perspective view of the assemblies mounted behind the sub-chassis of the tape recorder shown in FIG. 7.

A change-over mechanism assembly for another selecting mode will now be described with reference to FIGS. 7 and 8. This assembly is arranged behind sub-chassis 80 and includes a pin 129 extending from sub-chassis 80 which rotatably supports an intermediate lever 130. A lower end 130a of lever 130 passes through an opening 131 (See FIG. 5) of sub-chassis 80 so that end 130a is positioned on the front side of chassis 80, where it is engaged and pushed by the top of L-shaped lever 11a which is associated with the fast forward push-button 11. A fast forward selector 132 is arranged at the top side of the intermediate lever 130 in FIG. 7. Selector 132 is rotatably supported on sub-chassis 80 by a pin 133 and is connected with the intermediate lever 130 through a coil spring 134.

A play gear 135 is rotatably mounted behind sub-chassis 80, on shaft 84 which supports pause gear 83, and includes a toothless portion 136. The rotation of play gear 135 is independent of that of pause gear 83. Play gear 135 is driven by pinion 81 secured to capstan 55 when gear 135 is in engagement with pinion 81. A pin 137 extends from the bottom surface of gear 135 and a coil spring 139 is extended between pin 137 and a pin 138 extending from sub-chassis 80. With this construction gear 135 is urged to rotate in a direction so as to engage with pinion 81. Play gear 135 is also provided with a roller 140 on its bottom surface and a stop segment 141 on its upper surface.

The stop segment 141 of play gear 135 engages with a hook member 143 formed on one end of a trigger lever 142 in an inoperative state. In this position, play gear 135 is prevented from moving into engagement with pinion 81. Trigger lever 142 is rotatably supported on sub-chassis 80 by a pin 144 by a coil spring 145. A side portion of the other end of trigger lever 142 faces a bent tab 147 formed on a connecting lever 146 which is rotatably supported on locking plate 17 by a pin 148. Lever 146 is pulled downwardly as viewed in FIG. 7 by a coil spring 149. A pin 150 extends from the front surface of connecting lever 146.

A trigger timing lever 151 is disposed under trigger lever 142 and is also rotatably supported on pin 144. Lever 151 is urged in the clockwise direction as viewed in FIG. 7 around pin 144 by a coil spring 152. An arcuate shaped opening or slot 153 is formed on lever 151 to receive pin 138 extending from sub-chassis 80. In addition, lever 151 is provided with a hook portion 154 which is engageable with the stop segment 141 of play gear 135.

A reset lever 155 is arranged before trigger lever 151 and includes a cut-out portion 156 at one end to receive a pin 150 extending from connecting lever 146. One side of the cut-out portion 156 defines an angled segment on which pin 150 rides. Lever 155 also includes an integral extending arm segment 158 and the other end of lever 155 is engageable with pin 100 of pause trigger lever 91.

An operating lever 160 is arranged before trigger timing lever 151 and is rotatably supported on sub-chassis 80 by a pin 159. Lever 160 is designed to be driven by roller 140 of play gear 135 and includes an extending pin 161 to push the top of trigger timing lever 151. In addition, a reset plate 163 is supported on lever 160 by a pin 162 with reset plate 163 being urged in the clockwise direction as viewed in FIG. 7 around pin 162 relative to operating lever 160 by a coil spring 164. However, lever 163 is prevented from rotating by a bent tab 165 formed on lever 160 which engages a side of lever 163. A pin 166 is provided extending from the top of reset plate 163 to push arm 158 of the reset lever 155.

Sub-chassis 80 supports a solenoid-plunger 167 to lock operating lever 160 in its active position. Plunger 167 is energized in the ordinary state and is deenergized when micro switch 21 is pushed. Plunger 167 is provided with an armature 168 which is supported by one end of a lock lever 170 through a pin 169. Lock lever 170 is rotatably supported on sub-chassis 80 by a pin 171 and is urged in the counter-clockwise direction as viewed in FIG. 7 by coil spring 152. A lock plate 173 is supported on the other end of lock lever 170 by a pin 172 and a coil spring 174 is extended between lock lever 170 and lock plate 173 which engages with pin 161 to maintain operating lever 160 in the active position.

Figure 11:
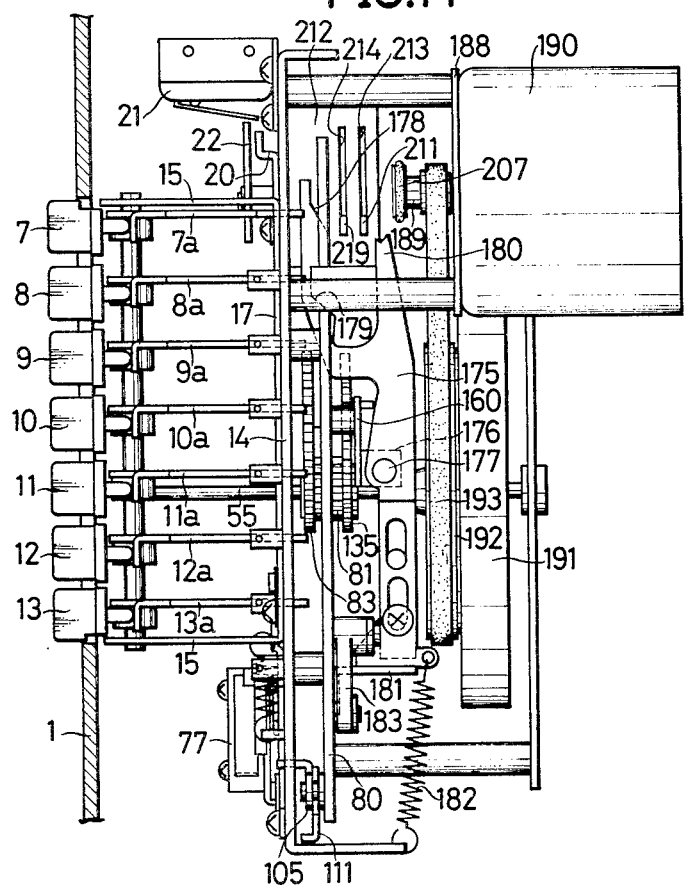
FIG. 11 is a right side view of the tape recorder.

Operating lever 160 is associated with an operating slide 175 which is connected with lever 160 by a pin 177 mounted on a bent tab 176 of lever 160. Operating slide 175 is arranged to slide along the bottom surface of sub-chassis 80 in the vertical direction as viewed in FIG. 7. The operating slide 175 defines a pair of angled segments 178 and 179 in its top end portion as shown in FIG. 8 and FIG. 11. The first angled segment 178 is formed for contact with fast forward selector 132, and the second angled segment 179 is formed for contact with rewind selector 125. Operating slide 175 also includes an actuating portion 180 and an L-shaped actuating plate 181 is connected to the lower end of operating slide 175. Slide 175 is urged downwardly as viewed in FIG. 11 by a coil spring 182.

A transmitting lever 183 is arranged behind sub-chassis 80 and is rotatably supported thereon by a pin 184. Lever 183 rotates in the clockwise direction as viewed in FIG. 7 around pin 184 when the lever is pushed by actuating plate 181 associated with operating slide 175. A control lever 185 is also arranged behind sub-chassis 80 and is rotatably supported on sub-chassis 80 by a pin 186. Control lever 185 is connected with transmitting lever 183 through a connecting link 187 whereby the rotation of the transmitting lever 183 is transmitted to control lever 185 to control the position of the head chassis assembly 42.

Next a tape drive assembly will be described with reference to FIGS. 9 and 10. The tape drive assembly includes a motor chassis 188 arranged behind sub-chassis 80 and a motor 190 supported by the motor chassis 188. A pulley 189 is secured to the out-put shaft of motor 190 and is connected to a pulley 192 associated with a flywheel 191 secured to capstan 55 by a belt 193.

An L-shaped supporting lever 194 is arranged adjacent flywheel 191 and is rotatably secured to chassis 14 by a pin 195. A bearing portion 196 is formed on one end of lever 194 through which friction wheel 73 is journalled and a pulley 197 is rotatably mounted to the lower end of friction wheel 73. Lever 194 is urged in the clockwise direction as viewed in FIG. 9 around pin 195 by a coil spring 198. A pin 199 extends from the other end of lever 194 and is engageable with a hook portion 200 (FIGS. 3 and 4) formed on the upper end of head chassis assembly 42.

Figure 9:
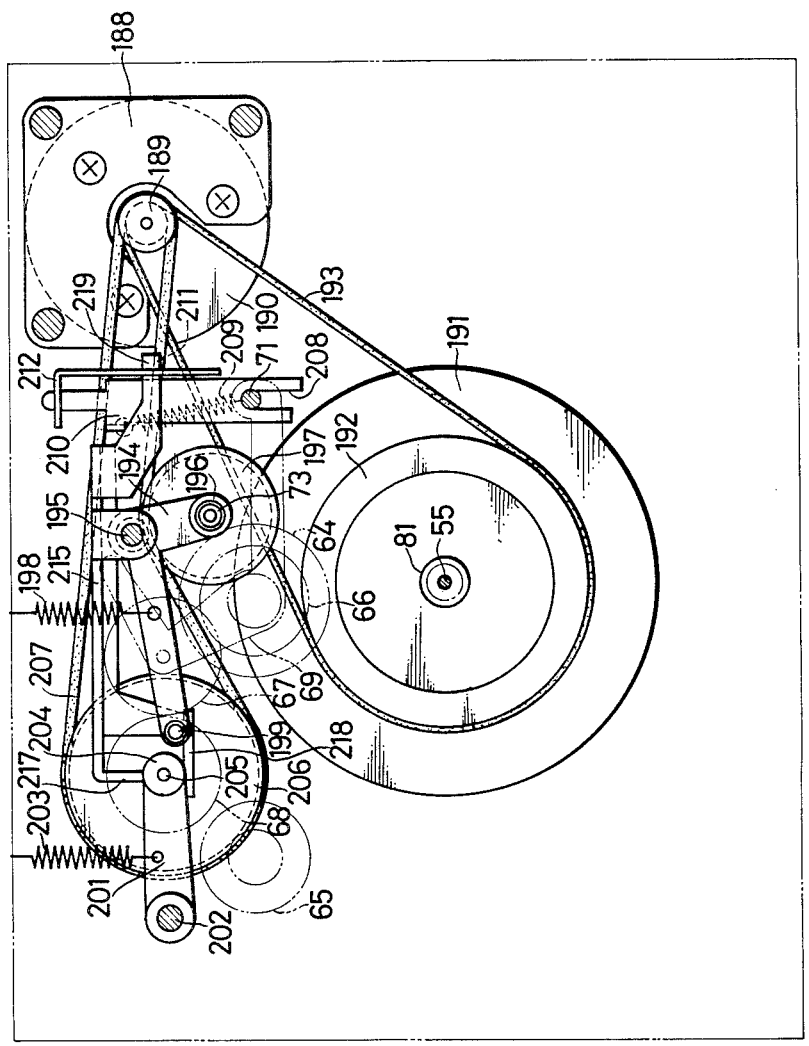
FIG. 9 is an elevational view of the tape recorder taken along the line IX—IX in FIG. 2.
Figure 10:
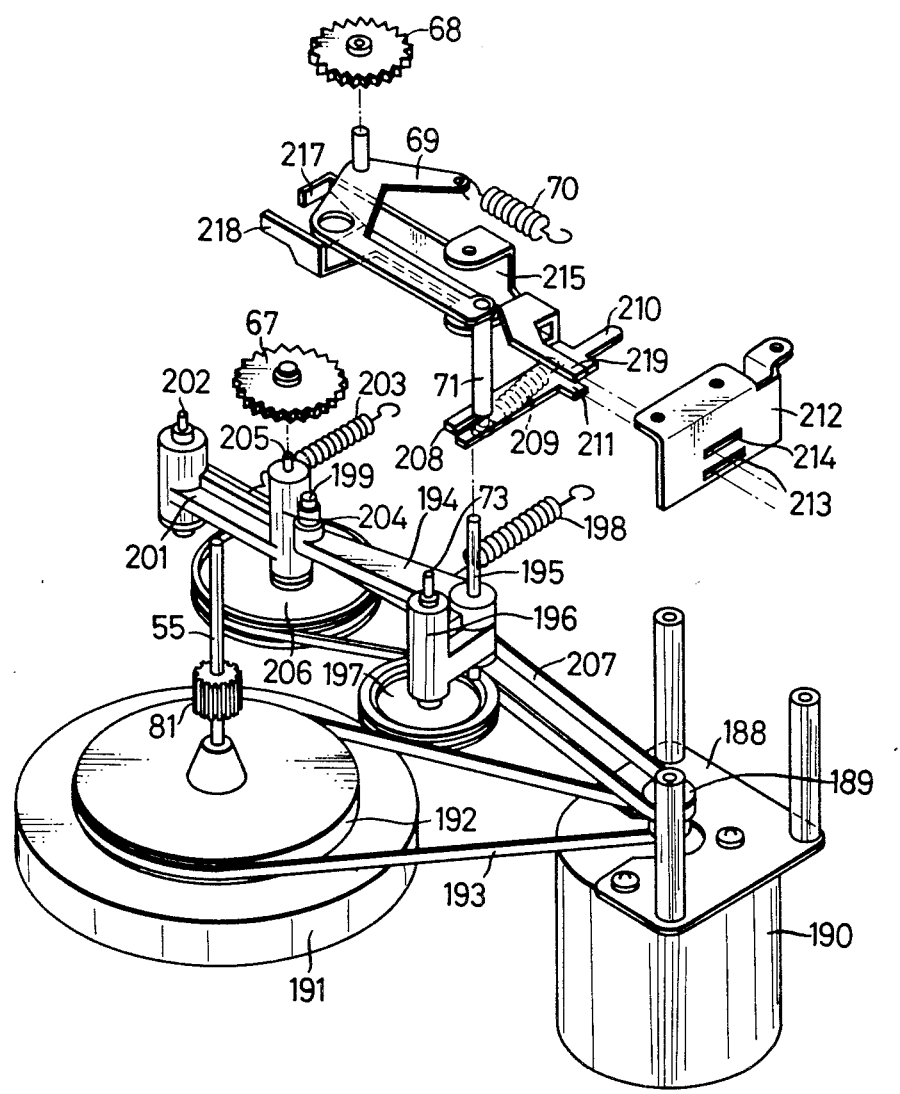
FIG. 10 is an exploded perspective view of the tape driving assembly shown in FIG. 9.

Another supporting lever 201 disposed adjacent lever 194 is rotatably mounted on chassis 14 by a pin 202 and lever 201 is urged in the counter-clockwise direction as viewed in FIG. 9 around pin 202 by a coil spring 203. Lever 201 is provided with a bearing portion 204 in which a shaft 205 is journaled. Drive gear 67 is secured to the upper end of shaft 205 and a pulley 206 is secured to the lower end of shaft 205. A belt 207 is extended between the pulley 189 and the pulley 206 with an intermediate portion of belt 207 disposed to drivingly engage with pulley 197.

A fast forward actuation plate 210 is arranged under chassis 14. Plate 210 defines a U-shaped cut-out portion 208 in which pin 71 is received. A coil spring 209 is extended between pin 71 and plate 210 to urge the pin into cut-out portion 208. Fast forward plate 210 also includes a tongue 211 which is received in a slit 213 formed on a supporting plate 212 secured to chasis 14. A rewind plate 215 is rotatably mounted to chassis 14 by pin 195 and is disposed above fast forward plate 210. Plate 215 has a pair of opposed arm segments 217 and 218 which grip bearing portion 204 of the supporting lever 201. Plate 215 also includes a tongue 219 which is received in a second slit 214 formed on supporting plate 212.

There now will be described various operations of the tape recorder according to one embodiment of this invention beginning with a description of the change-over operation for establishing a reproducing mode.

With reference to FIGS. 12 to 15, the reproducing mode is established by the depression of reproducing push-button 10 from the stop mode shown in FIGS. 2 to 11. That is, the L-shaped lever 10a associated with reproducing push-button 10 rotates against the urging force of coil spring 10b when the reproducing push-button 10 is depressed. The top of lever 10a goes over locking portion 17c of locking plate 17 and is locked by locking plate 17. In this locking operation plate 17 displaces upwardly as shown by the broken line in FIG. 12. As a result, connecting lever 146 displaces upwardly as indicated by the arrow in FIG. 13 against the force of coil spring 149 because connecting lever 146 is connected with locking plate 17 through pin 148. With this movement, bent tab 147 of connecting lever 146 pushes the right end of trigger lever 142 to rotate lever 142 counter-clockwise as viewed in FIG. 13 around pin 144 against the urging force of coil spring 145.

Hook portion 143 of trigger lever 142 now disengages from stop portion 141 of play gear 135 freeing gear 135 for rotation. In this stage, toothless portion 136 of play gear 135 faces pinion 81. However, play gear 135 is under the influence of coil spring 139 which urges gear 135 to rotate in the clockwise direction as viewed in FIG. 13. Hence, play gear 135 rotates clockwise and engages with pinion 81. The pinion 81 is driven by motor 190, through pulley 189, belt 193, pulley 192 and capstan 55 and, thus, play gear 135 is also rotated in the clockwise direction.

Figure 13:
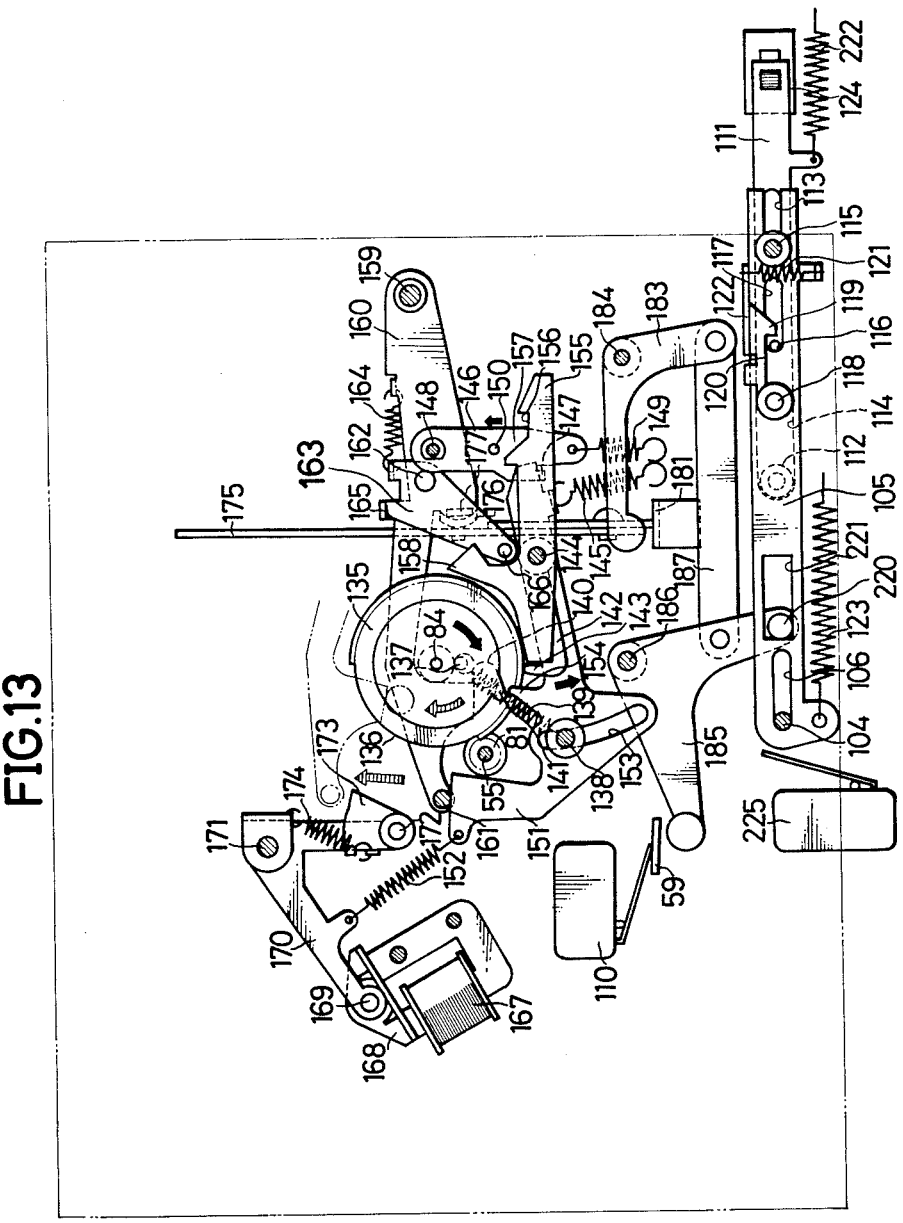
Figure 14:
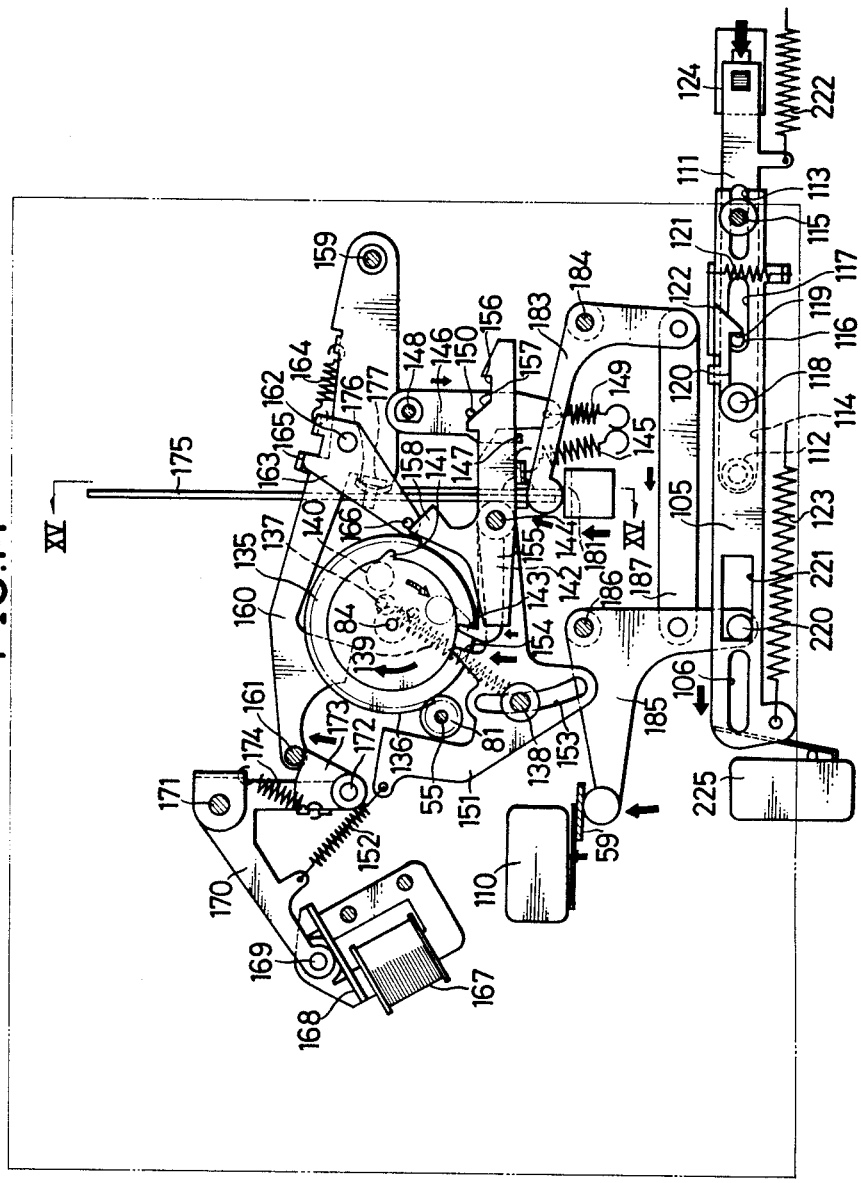

Roller 140 on play gear 135 contacts and pushes operating lever 160 to rotate lever 160 clockwise as viewed in FIG. 13 around pin 159 as play gear 135 is driven. With this rotation of lever 160 pin 161 mounted on top of operating lever 160 engages and pushes lock plate 173 to rotate plate 173 in the counter-clockwise direction as viewed in FIG. 13 around pin 172 against the urging force of coil spring 174 until pin 161 goes over plate 173. As soon as pin 161 goes over plate 173, lock plate 173 is restored to its original position by coil spring 174 and pin 161 is locked by plate 173, as shown in FIG. 14. Thus, operating lever 160 is maintained in its active position. As play gear 135 rotates further, and after one revolution of toothless portion 136, gear 135 faces pinion 81 and stop portion 141 of play gear 135 engages the hook portion 143 of trigger lever 142 which has already been restored to its original position, whereby the rotation of one cycle of play gear 135 is completed.

Figure 15:
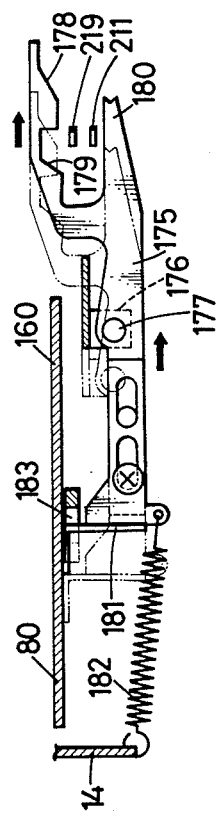
FIG. 15 is a cross sectional view taken along the line XV—XV in FIG. 14.

With the rotation of operating lever 160 responsive to the rotation of play gear 135, operating slide 175 displaces to the right as viewed in FIG. 15 along a path parallel to sub-chassis 80 against spring 182 because slide 175 is connected with operating lever 160 through pin 177. In this reproducing mode of operation, rewind selector 125 and fast forward selector 132 are both in an inactive position. Coil spring 182 urges slide 175 in an oblique direction so that actuating plate 181 is pressed to sub-chassis 80.

By the displacement of operating slide 175, actuating plate 181 pushes transmitting lever 183 to rotate lever 183 in the clockwise direction as viewed in FIG. 14 around pin 184. Accordingly, control lever 185 rotates clockwise as viewed in FIG. 14 around pin 186 because control lever 185 is associated with transmitting lever 183 through connecting link 187. Then, pin 220 mounted on control lever 185 pushes the side edge of oblong opening 221 of recording slide 105 to displace slide 105 leftward as viewed in FIG. 14 against the resilient force of coil spring 123. Therefore, reproducing slide 111 displaces leftward as viewed in FIG. 14 against coil spring 222 because slide 111 is connected to slide 105 through connecting lever 120 and pin 116. Whereby the recording-reproducing change-over switch, the actuating portion of which is connected to the slide 111, is changed over to the reproducing state.

Figure 12:
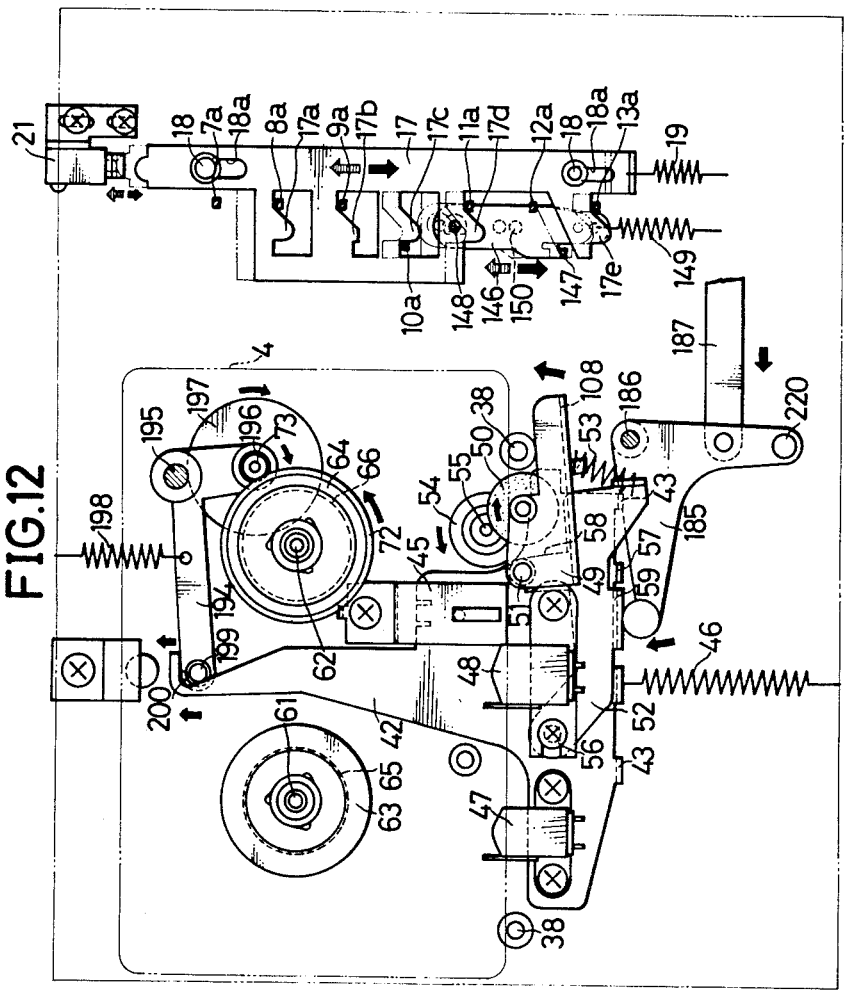
FIG. 12 to FIG. 14 are front views of important parts of the tape recorder showing the reproducing mode of operation.

The rotation of control lever 185 pushes bent tab 59 of head chassis assembly 42 to displace head chassis assembly 42 upwardly as viewed in FIG. 12 against the urging force of coil spring 46. Accordingly, pinch roller 50, supported by head chassis assembly 42 through pinch roller lever 49, moves forward to its active position where the pinch roller 50 presses the magnetic tape in tape cassette 4 against capstan 55 to drive the tape at its predetermined constant speed. The running tape contacts erasing head 47 and recording-reproducing head 48 which are supported on head chassis assembly 42. In addition, the forward displacement of head chassis assembly 42, separates hook portion 200 of head chassis assembly 42 from pin 199 mounted on supporting lever 194. Thus, supporting lever 194 rotates clockwise as viewed in FIG. 12 around pin 195 under the urging force of coil spring 198. Accordingly, friction wheel 73 mounted on supporting lever 194 contacts rubber ring 72 of reel mount 64 enabling reel mount 64 to be driven by motor 190 through motor pulley 198, belt 207, pulley 197, friction wheel 73 and rubber ring 72. As a reel in tape cassette 4 is engaged with reel mount 64 the running magnetic tape is wound on the reel. Furthermore, play detecting switch 110 is pushed by head chassis assembly 42 in its forward position. By the above mentioned operation, the reproducing mode is established, and the audio signals recorded on the magnetic tape of tape cassette 4 are reproduced.

Next, there will be described the change-over operation from the reproducing mode to the stop mode with reference to FIGS. 16 to 18.

When stop push-button 7 is depressed with the recorder in the reproducing mode, L-shaped lever 7a associated with stop push-button 7 rotates against the urging force of coil spring 7b. The top end of lever 7a pushes the angled portion 25 of stop lever 22 to rotate lever 22 clockwise as viewed in FIG. 16 around pin 23 so that actuating portion 26 of lever 22 contacts micro switch 21 to close the switch.

Figure 35:
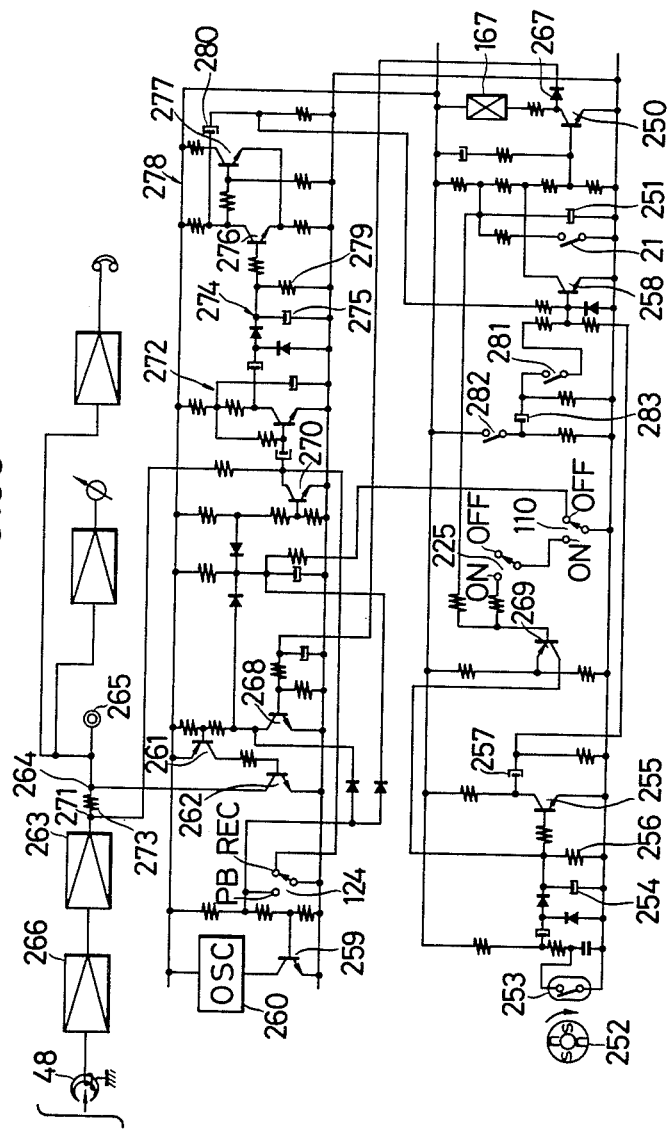
FIG. 35 is a circuit diagram of the tape recorder.

Switch 21 is, as shown in FIG. 35, connected to the base of a transistor 250 through resistors, and a condenser 251 is connected in parallel with switch 21. Accordingly, condenser 251 is discharged, and the base voltage of the transistor 250 drops, when the micro switch 21 is closed, transistor 250 turns off for about 0.1 sec and plunger 167, connected to the collector of transistor 250, is deenergized.

Figure 16:
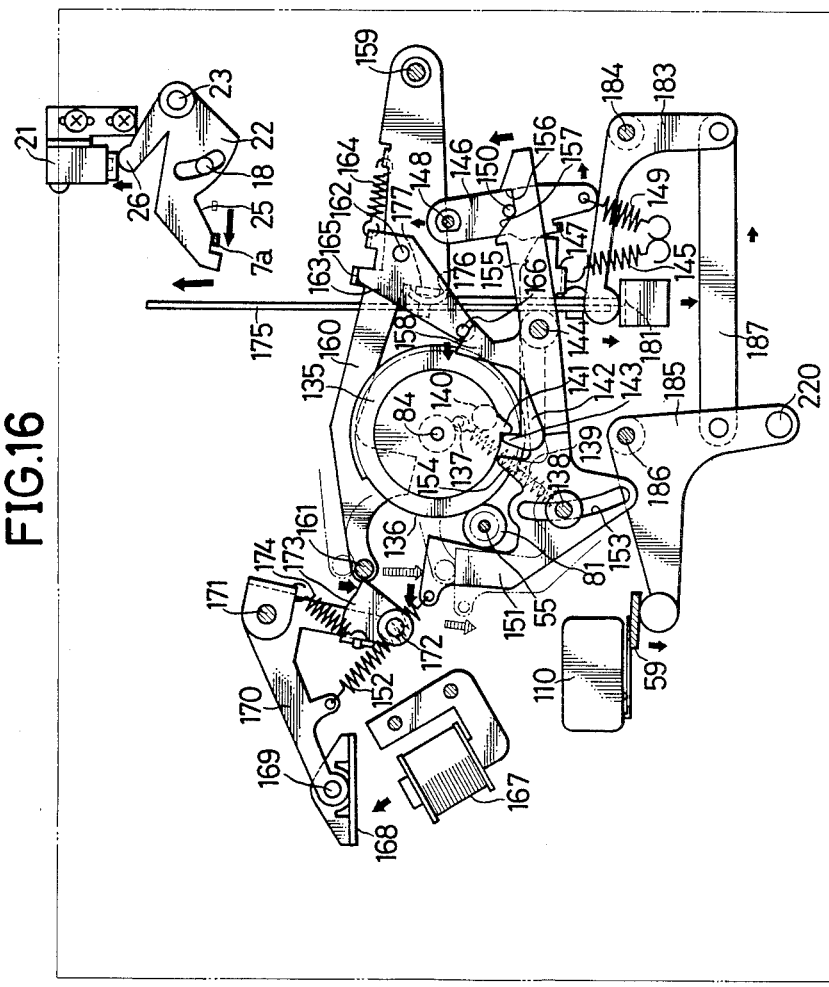
FIG. 16, FIG. 17 and FIG. 18 are front views of important parts of the tape recorder showing the changing-over operation from the reproducing mode to the stop mode.
Figure 17:
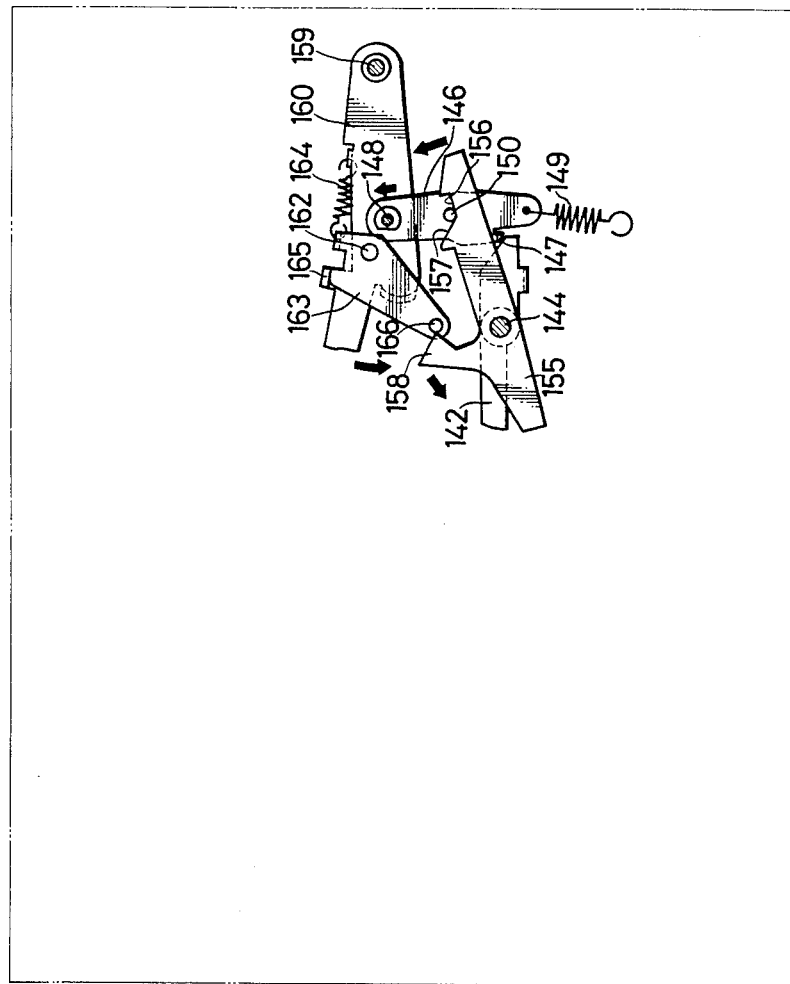

Hence, armature 168, shown in FIG. 16, becomes free from the magnetic attraction of plunger 167 and lock lever 170 rotates clockwise as viewed in FIG. 16 around pin 171 to displace lock plate 173 to the left as viewed in FIG. 16. With this movement, pin 161 mounted on the top of operating lever 160 is disengaged from lock plate 173 and operating lever 160 rotates counter-clockwise as viewed in FIG. 16 around pin 159 under the urging of coil spring 182 which is associated with operating lever 160 through operating slide 175.

In response to the rotation of operating slide 160 operating slide 175 displaces downwardly as viewed in FIG. 16 and actuating plate 181 is separated from transmitting lever 183. Hence, lever 183 rotates counterclockwise as viewed in FIG. 16 around pin 184. This permits control lever 185 to rotate counter-clockwise as viewed in FIG. 16 around pin 186 because control lever 185 is associated with lever 183 through connecting link 187. With this movement, head chassis assembly 42 becomes free from the pushing force of lever 185 through bent tab 59 and head chassis assembly 42 is displaced to its inactive position under the resilient force of coil spring 46 to move erasing head 47 and recording-reproducing head 48 away from the magnetic tape in cassette 4. In addition, pinch roller 50 is displaced rearwardly in accordance with the rearward displacement of head chassis assembly 42 and is disengaged from capstan 55 so that tape is no longer driven.

Hook portion 200 of head chassis assembly 42 pulls pin 199 of lever 194 to rotate lever 194 counter-clockwise around pin 195 against the urging force of coil spring 198 with the displacement of the head chassis assembly 42. With this movement, friction wheel 73 is separated from reel mount 64 and reel mount 64 stops rotating. In addition, play detecting switch 110 is released from its depressed state responsive to the displacement of head chassis assembly 42. Still further, recording slide 105 and reproducing slide 111 displace to their inactive positions responsive to the rotation of control lever 185 and the changeover switch is placed into the recording state.

With the return rotation of operating lever 160 pin 166 of reset plate 163, supported above operating lever 160, pushes the top of arm 158 of reset lever 155 and reset lever 155 rotates counter-clockwise as viewed in FIG. 16 around pin 144. During the initial period of the rotation of reset lever 155, the angled portion 157 of cut-out portion 156 formed on lever 155 pushes pin 150 to rotate connecting lever 146, on which pin 150 is mounted, counter-clockwise as viewed in FIG. 16 around pin 148. Then, bent tab 147 of connecting lever 146 is displaced to its inactive position where tab 147 is not engaged with trigger lever 142. With the further rotation of reset lever 155 cut-out portion 156 of lever 155 pushes pin 150 of connecting lever 146 to displace the lever upwardly as viewed in FIG. 17 against the urging force of coil spring 149.

Figure 18:
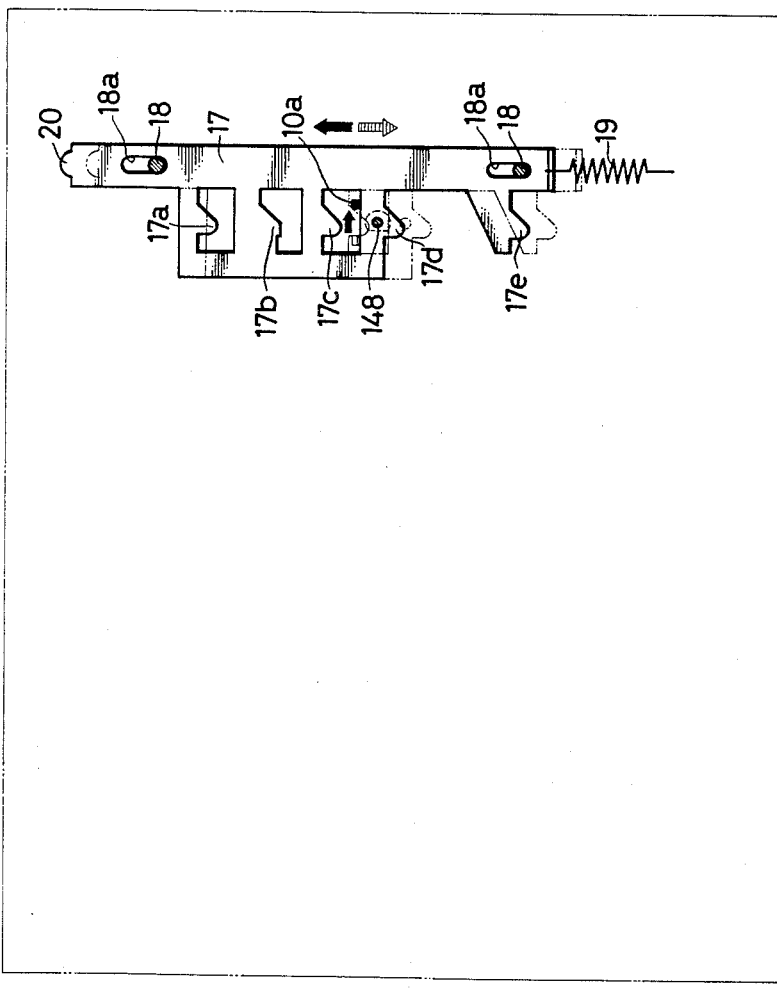

This movement displaces locking plate 17 upwardly, as shown in FIG. 18, against the urging force of coil spring 19 responsive to the displacement of connecting lever 146, since connecting lever 146 is connected with locking plate 17 through pin 148. With this movement, L-shaped lever 10a is released from its locked position by lock portion 17c of locking plate 17 and L-shaped lever 10a is restored to its original or inactive position by coil spring 10b. As soon as L-shaped lever 10a is released, locking plate 17 displaces downwardly as shown by broken line in FIG. 18. Thus, the tape recorder is changed over to the stop mode from the reproducing mode.

The tape recorder is also provided with an automatic shut-off apparatus which changes the tape recorder from the operating mode to the stop mode without depression of stop push-button 7. That is, a tape counter is connected to reel mount 63 or 64 through a belt, and the tape counter is rotating when tape is running. The counter is provided with a magnet ring 252 as shown in FIG. 35. A reed relay 253 is closed and opened alternately in accordance with the alternation of the magnetic field of magnet 252 when magnet 252 is rotating. Thus an alternate signal is generated and is supplied to a condenser 254, which constitutes a part of a rectifier circuit to charge condenser 254. Accordingly, the base voltage of transistor 255 is maintained at the higher level, and the transistor is turned to be in the onstate when the tape is running.

When all of the tape is wound on one of the reels, reel mounts 63 and 64 stop rotating because of tape tension and the magnetic ring also stops rotating. Therefore, the charge of condenser 254 is discharged through a resistor 256 and the base voltage of transistor 255 is changed to the lower level whereby transistor 255 is turned off. When transistor 255 is turned off a condenser 257 generates a positive pulse which is supplied to the base of a transistor 258. Then, transistor 258 is turned on to drop the base voltage of transistor 250 whereby plunger 167 is deenergized to change the tape recorder over to the stop mode in the same manner as when stop push-button 7 is pushed.

Next, the operation of the tape recorder for changing over from the stop mode to the recording mode will be described with reference to FIG. 19. This operation is established by the depression of recording push-button 13 while the recorder is in the stop mode.

With the depression of recording push button 13, L-shaped lever 13a associated with recording push-button 13 rotates and the top of lever 13a goes over lock portion 17e of locking plate 17. Thus locking plate 17 is displaced upwardly as viewed in FIG. 19. With the displacement of locking plate 17 the magnetic tape is driven and runs at its predetermined constant speed and is contacted by magnetic heads 47 and 48 as described in the reproducing mode of operation.

Figure 19:
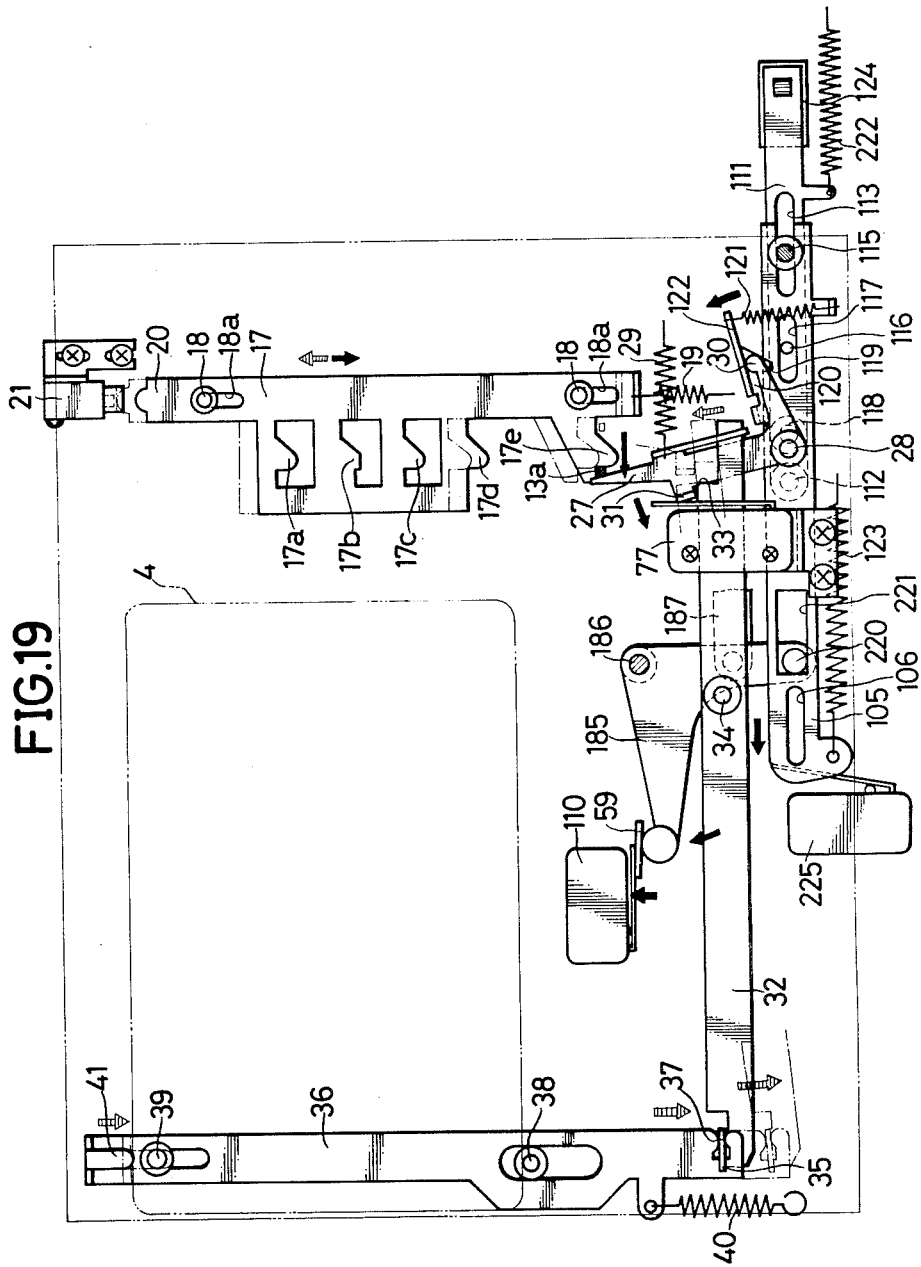
FIG. 19 is a front view of the tape recorder showing the recording mode of operation.

Further, the rotation of L-shaped lever 13a, causes recording selector 27 to rotate counter-clockwise as viewed in FIG. 19 around pin 28 against the urging force of coil spring 29. With this movement, the selector 27 pushes record detecting switch 77 and the actuating portion 30 of the selector 27 pushes bent tab 122 of connecting lever 120 to rotate lever 120 counter-clockwise as viewed in FIG. 19 around pin 118 against the urging force of coil spring 121 to disengage shoulder position 119 of lever 120 from pin 116. Accordingly, reproducing slide 111 does not displace to the left as viewed in FIG. 19 even though recording slide 105 displaces to the left with the rotation of control lever 13a and change-over switch 124 is maintained in the recording state.

Again referring to FIG. 35, the base voltage of a transistor 259 is in the higher level when change-over switch 124 is in the recording state and transistor 259 is tuned on. In this state an electric source is supplied to an oscillator 260 and the output current of oscillator 260 is supplied to erasing head 47, by which the recorded signals on the magnetic tape are erased, and new audio signals are recorded on the tape by recording-reproducing head 48.

When the frangible tab of a tape cassette is removed to prevent inadvertent erasing of recorded signals on the magnetic tape, the detecting portion 41 of detecting slide 36 enters into the opening of the cassette formed by the removal of this tab. In this instance, detecting slide 36 displaces downwardly as shown by broken line in FIG. 19 by coil spring 40. This causes change-over lever 32 to rotate counter-clockwise as viewed in FIG. 19 around pin 34 because lever 32 is connected with slide 36 through the engaging tab 35 and cut-out portion 37. Therefore, the cut-out portion 33 of the lever 32 engages bent tab 31 of recording selector 27. Thus selector 27 is prevented from rotation by the cut-out portion 33 of lever 32 and recording push-button 13 is prevented from being depressed to preclude the tape recorder from changing over to the recording mode. Accordingly, the inadvertent erasing of recorded signals on the tape is effectively prevented.

Next, the fast-forward mode of operation will be described with reference to FIGS. 20 and 21.

The fast forward mode is established by depressing fast forward push-button 11 while the recorder is in the stop mode. When fast forward push-button 11 is depressed, L-shaped lever 11a associated with fast forward push-button 11 rotates against the urging force of coil spring 11b and the top of lever 11a goes over lock portion 17d of locking plate 17. With this operation, locking plate 17 displaces and operating lever 160 is rotated clockwise as viewed in FIG. 20 around pin 159 by the rotation of play gear 135.

Figure 20:
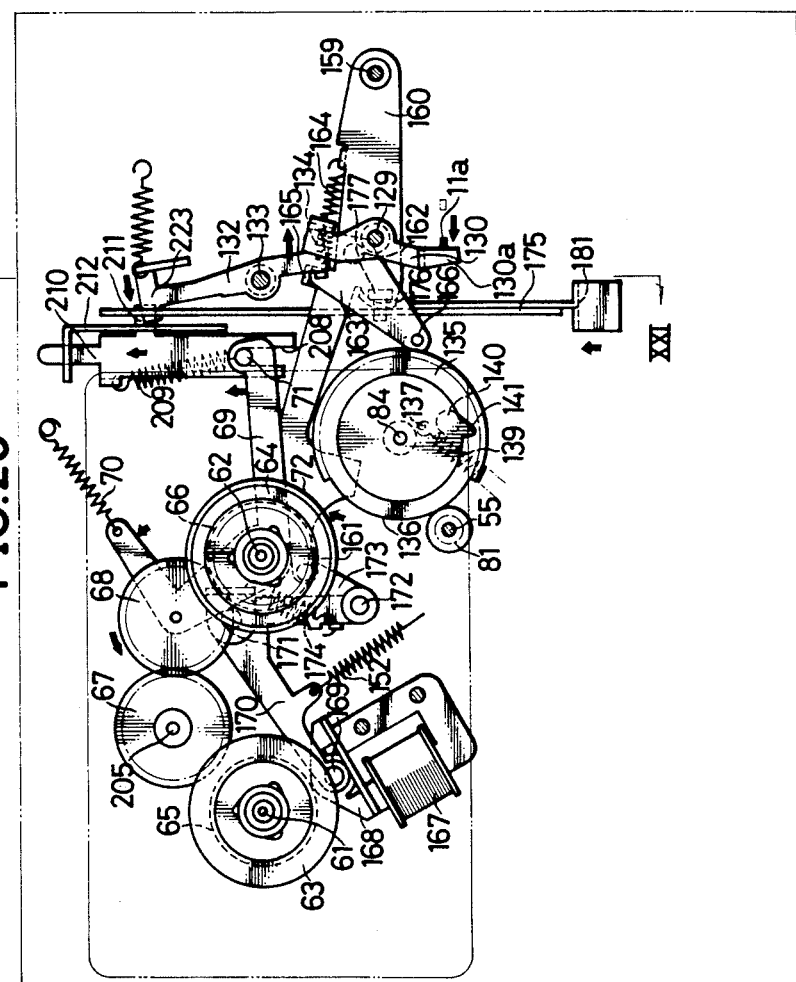
FIG. 20 is a front view of the tape recorder showing the fast-forward mode of operation.

Movement of L-shaped lever 11a rotates intermediate lever 130 clockwise as viewed in FIG. 20 around pin 129 to rotate fast forward selector 132 counter-clockwise around pin 133 since selector 132 is connected to lever 130 through the limitter coil spring 134 and actuating portion 223 of the selector projects into the path of operating slide 175.

Figure 21:
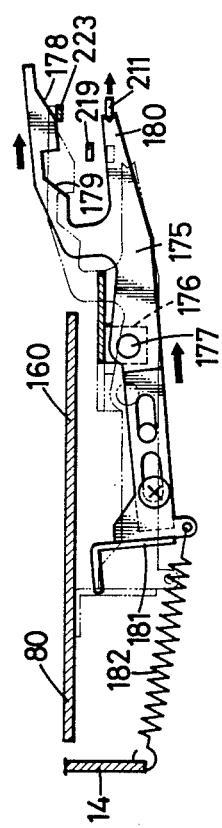
FIG. 21 is a cross sectional view taken along the line XXI—XXI in FIG. 20.

Accordingly, the actuating portion 223 contacts angled portion 178 of slide 175 to rotate slide 175 counter-clockwise as viewed in FIG. 21 around pin 177 against the urging force of coil spring 182. Thus slide 175 displaces to the right as viewed in FIG. 21 responsive to the rotation of operating lever 160. Therefore L-shaped actuating plate 181 connected to slide 175 does not push transmitting lever 183. However, the actuating portion formed at the top of operating slide 175 pushes tongue 211 of fast forward plate 210 to displace plate 210 upwardly as viewed in FIG. 20 to rotate lever 69 counter-clockwise as viewed in FIG. 20 around shaft 62 against the resilient force of coil spring 70 since lever 69 is connected with plate 210 through coil spring 209 and pin 71. Therefore, idler gear 68 supported on lever 69 engages drive gear 67. Hence, reel mount 64 is driven by motor 190 through pulley 189, belt 207, pulley 206, gear 67, gear 68 and gear 69 to rotate reel mount 64 at a relatively high speed. Thus, a reel within a tape cassette engaged with reel mount 64 winds the magnetic tape at a relatively high speed to establish the fast forward mode of operation.

In the fast forward mode, the play detecting switch 110 is opened as shown in FIG. 35, because head chassis assembly 42 is in its disengaged position. Hence, the base voltage of a transistor 261 is at the lower level. Therefore, electric source is supplied to the base of a transistor 262 through the transistor 261. Accordingly, a connecting point 264 of the signal line of a line amplifier 263 is connected to ground through transistor 262, and, hence the output signal is not supplied to an output terminal 265. The line amplifier 263 amplifies the output signal of a pre-amplifier 266.

The output signal is cut off not only in the fast forward mode but also in the rewind mode and in the stop mode. In these modes, play detecting switch 110 is turned off. Further, the output signal of line amplifier 263 is cut off in the instance when the tape recorder is changed to operating modes or the operating modes are released. That is, in these cases, switch 21 is pushed by the displacement of locking plate 17 and plunger 167 is deenergized to turn on transistor 268 through diode 267, whereby the output signal of the line amplifier 263 is cut off.

Figure 22:
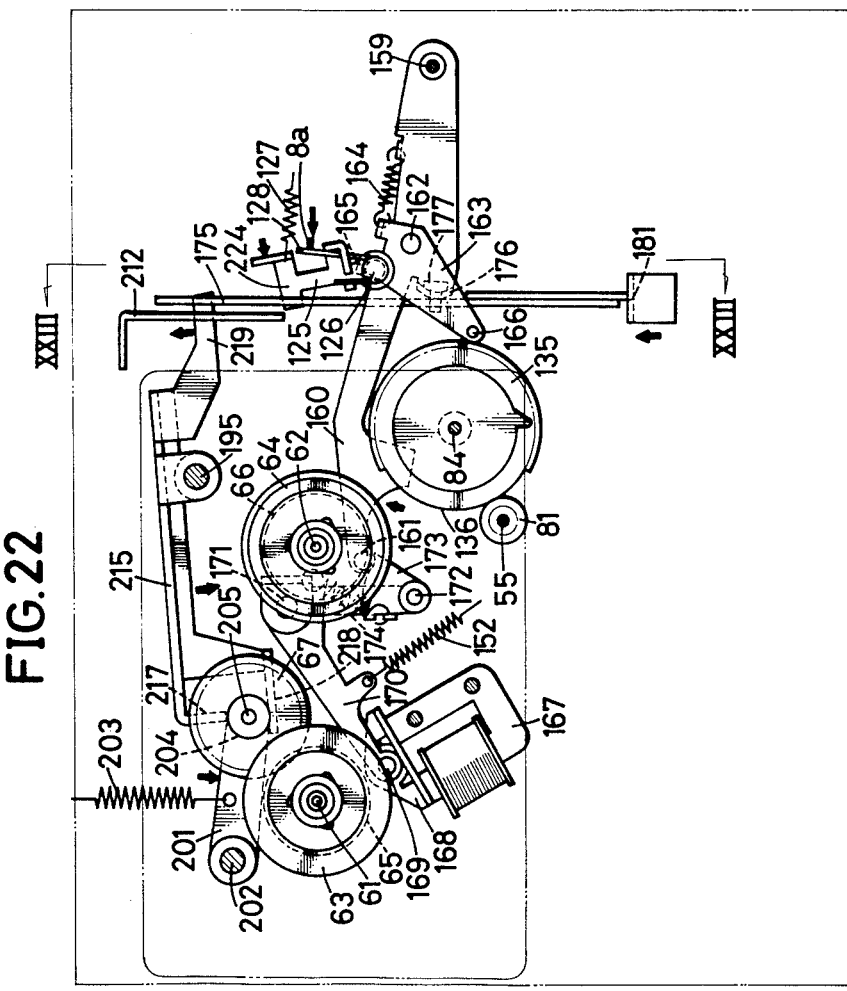
FIG. 22 is a front view of the tape recorder showing the rewind mode of operation.

Next, the rewind mode of operation will be described with reference to FIGS. 22 and 23.

The rewind mode is established by depressing rewind push-button 8 with the recorder in the stop mode. When rewind push-button 8 is depressed L-shaped lever 8a associated with rewind push-button 8 rotates against the urging force of coil spring 8b. Hence the top of L-shaped lever 8a goes over lock portion 17a of locking plate 17 and locking plate 17 is displaced upwardly to rotate operating lever 160 clockwise as viewed in FIG. 22 around pin 159 responsive to rotation of play gear 135, as described in the operation of the reproducing mode.

In addition, the top of L-shaped lever 8a pushes rod spring 128, which is mounted on rewind selector 125, when L-shaped lever 8a rotates. This rotates rewind selector 125 counter-clockwise as viewed in FIG. 22 around pin 129. Hence, actuating portion 224 of selector 125 projects into the path of operating slide 175.

Figure 23:
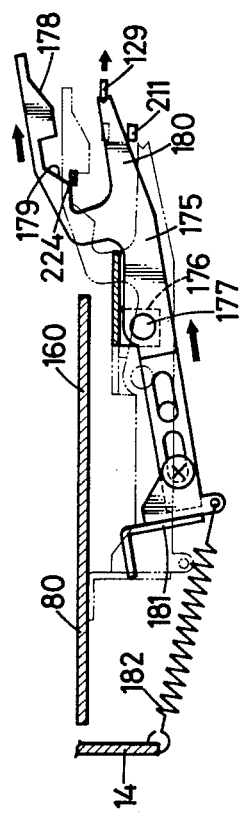
FIG. 23 is a cross sectional view taken along the line XXIII—XXIII in FIG. 22.

Accordingly, actuating portion 224 contacts the angled portion 179 of slide 175 to rotate slide 175 counter-clockwise as viewed in FIG. 23 around pin 177 against the urging force of coil spring 182. When slide 175 is displaced to the right as viewed in FIG. 23 responsive to the rotation of operating lever 160, actuating portion 180 of slide 175 pushes tongue 219 of rewind plate 215. Rewind plate 215 is thus rotated counter-clockwise as viewed in FIG. 22 around pin 195 and arms 217 and 218 push bearing portion 204 of supporting lever 201. Supporting lever 201 is then rotated clockwise as viewed in FIG. 22 around pin 202 against the resilient force of coil spring 203 to place drive gear 67 into engagement with gear 65. With this engagement, reel mount 63 is driven by motor 190 through pulley 189, belt 207, pulley 206, gear 67 and gear 65. The tape cassette reel engaged with reel mount 63 rotates at a relatively high speed in the reverse direction and the magnetic tape is wound by the cassette reel at a relatively high speed.

The rewind mode is released by the operation of a memory counter to change over the tape recorder into the stop mode. That is, a memory switch 281 (FIG. 35) should be in the closed state in the rewind mode for establishing the above operation. When the magnetic tape is rewound to the predetermined position determined by the memory counter, a switch 282 of the memory counter is closed resulting in a condenser 283 generating a positive pulse. This pulse is supplied to the base of transistor 258 through switch 281, and then the drive circuit for plunger 167 functions to deenergize plunger 167 for a moment. Thereby the tape recorder is changed over to the stop mode.

The rewind mode of operation is also released and changed over to the stop mode manually by depressing stop push-button 7 while the recorder is in the rewind mode. This closes switch 21 deenergizing plunger 167 to change the tape recorder over to the stop mode.

Figure 24:
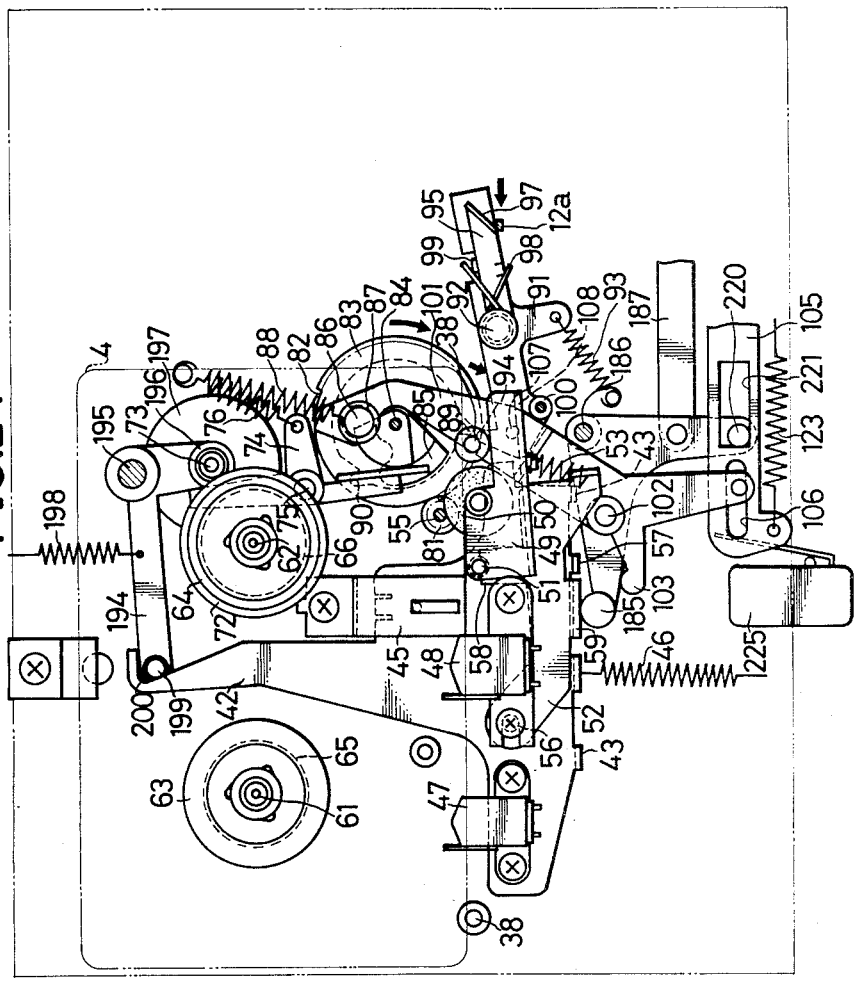
FIG. 24 and FIG. 25 are front views of the tape recorder showing the changing-over operation from the reproducing mode to the pause mode.

Next, the operation for changing over the tape recorder from the reproducing mode to the pause mode will be described with reference to FIGS. 24 and 25. The pause mode is established by depressing pause push-button 12 while the recorder is in the reproducing mode shown in FIG. 12. When pause push-button 12 is depressed with the recorder in the reproducing mode, L-shaped lever 12a associated with pause button 12 rotates against the urging force of coil spring 12b. Locking plate 17 has no lock portion which corresponds to lever 12a, and hence, locking plate 17 is not displaced when pause button 12 is depressed. Therefore reproducing push-button 10 is maintained in its active position and lever 10a is maintained locked by plate 17. Responsive to the rotation of lever 12a, the top of lever 12a pushes the angled portion 97 of sub-trigger lever 95 to rotate lever 95 counter-clockwise as viewed in FIG. 24 around pin 92. As the rotation of lever 95 is transmitted to pause trigger lever 91 through bent tab 99 of lever 91, pause trigger lever 91 is also rotated counter-clockwise as viewed in FIG. 24 around pin 92. Upon continued rotation of lever 12a, the top of lever 12a goes over the angled portion 97 of lever 95 and the top of lever 12a pushes the rear side of angled portion 97 to rotate sub-lever 95 counter-clockwise as viewed in FIG. 24 around pin 92 against the urging force of torsion spring 98 to restore L-shaped lever 12a to its original position so that lever 12a is not locked in its active position.

Responsive to the counter-clockwise rotation of pause trigger lever 91, hook portion 94 of pause trigger lever 91 disengages from stop portion 89 of pause gear 83. Consequently, pause gear 83 begins to rotate clockwise as viewed in FIG. 24, responsive to the torque generated by coil spring 88 until the toothless portion 82 of the pause gear 83 is displaced and gear 83 engages pinion 81. Thus pause gear 83 is driven by pinion or drive gear 81.

Figure 25:
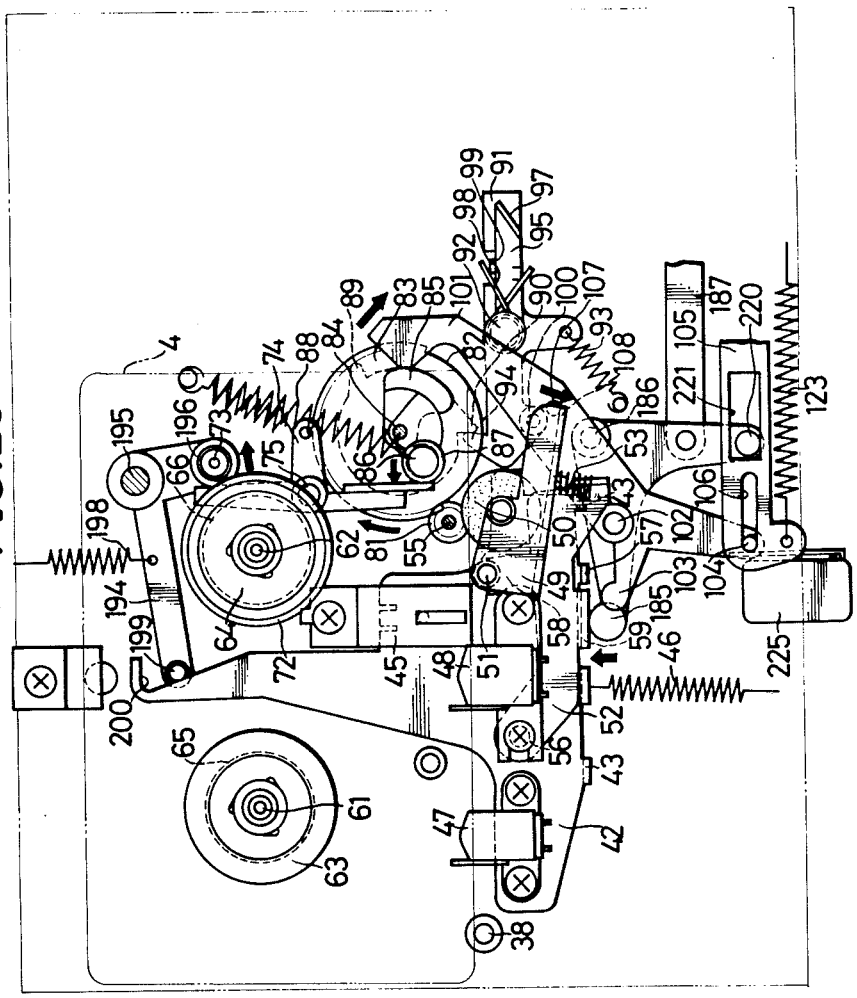

When pause gear 83 rotates, cam surface 85 on gear 83 pushes pause lever 101 rotating lever 101 clockwise as viewed in FIG. 25 around pin 102. With this movement, pin 107 mounted on lever 101 contacts and pushes arm 108 of pinch roller lever 49 to rotate lever 49 clockwise as viewed in FIG. 25 around pin 51. As a result, pinch roller 50 supported on lever 49 is disengaged from capstan 55 to release the magnetic tape pinched between pinch roller 50 and capstan 55 so that the tape is no longer driven.

Rotation of pause gear 83 also rotates roller 87, supported on gear 83 by pin 86, into contact with one end of change-over lever 74 to rotate lever 74 clockwise as viewed in FIG. 25 against the urging force of coil spring 76. With this rotation of lever 74, the other end of lever 74 pushes bearing portion 196 of supporting lever 194 and rotates lever 194 counter-clockwise as viewed in FIG. 25 around pin 195 against the urging force of coil spring 198. Hence, friction wheel 73 mounted on lever 194 is separated from rubber ring 72 of reel mount 64 and reel mount 64 is prevented from being driven. Accordingly, the rewinding operation of the magnetic tape by the reel engaged with reel mount 64 ceases.

In addition, with the rotation of pause lever 101, pin 104 extending from lever 101 is displaced to the left as viewed in FIG. 25 along the oblong opening 106 of recording slide 105 until the top of pin 104 pushes pause switch 225 to turn on switch 225 on.

In this way, the pause mode of operation is established wherein tape movement is stopped temporarily while maintaining the magnetic heads 47 and 48 in contact with the tape.

The magnetic tape does not run and reel mounts 63 and 64 do not rotate in the pause mode of the tape recorder and, hence, magnet 252 of the automatic shut-off apparatus (FIG. 35) stops rotating because the apparatus is connected with reel mount 63 or 64 through the belt. Accordingly, the tape recorder would be automatically changed over to the stop mode from the pause mode unless an override is provided to preclude change over to the stop mode. Accordingly, the tape recorder includes means to generate a false signal to prevent the tape recorder from being changed over to the stop mode of operation from the pause mode. Thus, in the pause mode, pause switch 225 and the play detecting switch 110 are both turned on and, hence, the base voltage of transistor 269 becomes lower level. Accordingly, condenser 254 is charged through transistor 269 to generate a false signal to maintain the base voltage of transistor 255 at the higher level and prevent plunger 167 from being deenergized.

The base of transistor 269 is connected to switch 21 and, hence, the base voltage of transistor 269 becomes lower level when switch 21 is closed. Therefore, the false signal is also generated when switch 21 is closed. Accordingly, when the mode selecting operation is performed in a state where the magnetic tape is completely wound on one of the cassette reels, the false signal is also generated by the closing of switch 21, which is closed in each of the mode selecting operations, and thereby the shut-off operation is performed even though the reel mounts do not rotate.

Next, the change-over operation from the pause mode to the stop mode will be described with reference to FIG. 26. This operation is established by depressing stop push-button 7. When stop push-button 7 is depressed, as described in the operation for change over from the reproducing mode to the stop mode, stop lever 22 rotates to close switch 21. Hence, plunger 167 is deenergized and the lock of operating lever 160 is released. Operating lever 160 then rotates counter-clockwise as viewed in FIG. 26 around pin 159 and pin 166 on reset plate 163 contacts and pushes arm 158 of reset lever 155 to rotate lever 155 counter-clockwise as viewed in FIG. 26 around pin 144 to displace locking plate 17 through connecting lever 146 and thereby release the lock of the reproducing push-button 10.

In addition, the rotation of reset lever 155 causes the lower side portion of lever 155 to contact and push pin 100 on pause trigger lever 91. In the pause mode, hook 94 of pause trigger lever 91 engages the second stop portion 90 of pause gear 83. Further, as mentioned above, the distance from the top of the first stop portion 89 to the center of the pause gear is longer than that from the top of the second stop portion 90 to the center of the pause gear and the size of the first stop portion 89 is larger than that of the second stop 90. Therefore, the position of pause trigger lever 91 in engagement with the first stop portion 89 is shifted clockwise around pin 92 by a predetermined angle relative to the position of pause trigger lever 91 in engagement with second stop portion 90. Further, the position of pin 100 on lever 91 in engagement with second stop portion 90 is shifted upwardly relative to the position of pin 100 on lever 91 in engagement with the first stop portion 89. Thus pin 100 of lever 91 pushes reset lever 155 only when pause trigger lever 91 engages with second stop portion 90.

Figure 26:
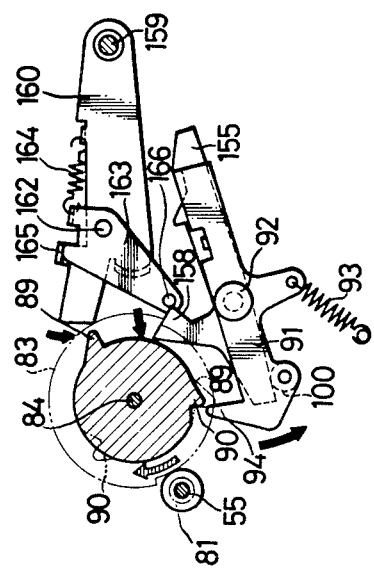
FIG. 26 is a front view of important parts of the tape recorder showing the releasing operation of the pause mode.

When pin 100 is pushed by reset lever 155, pause trigger lever 91 rotates counter-clockwise as viewed in FIG. 26 around pin 92 against the urging force of coil spring 93 to disengage hook 94 of lever 91 from stop portion 90. Hence, pause gear 83 rotates under the urging force of coil spring 88 until first stop portion 89 engages hook 94 of lever 91. Responsive to the rotation of pause gear 83, pause lever 101 rotates counter-clockwise as viewed in FIG. 26 around pin 102 to release the recorder from the pause mode of operation. That is, by the depression of stop push-button 7 the reproducing mode and the pause operation are released and the tape recorder is changed over directly to the stop mode of operation.

The release of the pause operation through stop push-button 7 is also achieved in combining operations of the pause mode and another mode, e.g., the review or cue mode. In other words, the pause operation is released by depressing push-button 7 when the recorder is in the review mode or cue mode.

In addition, in combining operations of the reproducing and pause modes, the pause mode is released and the tape recorder is changed over to the reproducing mode. This operation is established by depressing pause push-button 12 which disengages hook 94 of pause trigger lever 91 from second stop portion 90 of pause gear 83 thereby to change the tape recorder over to the reproducing mode. In a like manner, the tape recorder is changed over to the fast forward mode or the rewind mode when pause push-button 12 is depressed while the recorder is in the cue mode or the review mode. This operation will be described more fully hereinbelow.

Figure 27:
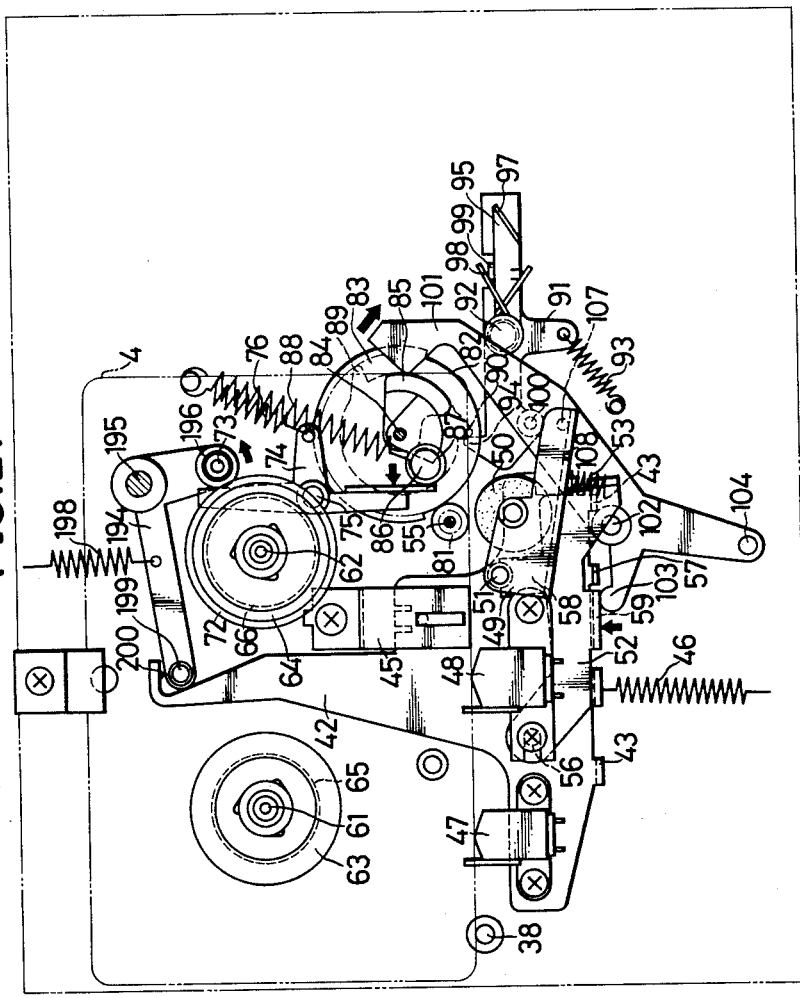
FIG. 27 is a front view of the tape recorder showing the independent pause operation.

Next an independent pause operation will be described with reference to FIG. 27. This operation is established by depressing pause push-button 12 while the recorder is in the stop mode. When pause button 12 is pushed pause trigger lever 91 rotates and the lock of pause gear 83 is released in the same manner as in the pause operation from the reproducing mode. Thus, pause gear 83 rotates and pause lever 101 rotates clockwise as viewed in FIG. 27 around pin 102. At this stage head chassis assembly 42 is in its retracted or inactive position, arm 103 of pause lever 101 pushes the head chassis assembly 42 through bent tab 59 of pushing lever 52. Hence, head chassis assembly 42 displaces upwardly as viewed in FIG. 27 in the forward direction against the urging force of coil spring 46 until head chassis assembly 42 is moved to an intermediate position between its active position and its inactive position. In this intermediate position magnetic heads 47 and 48 slightly contact the magnetic tape in the tape cassette.

Since pinch roller lever 49 is prevented from counter-clockwise rotation by pin 107 on pause lever 101, pinch roller 50 does not press the magnetic tape against capstan 55 and tape is not driven. Further, roller 87 of pause gear 83 rotates supporting lever 194 counter-clockwise as viewed in FIG. 27 around pin 195 agninst the urging force of coil spring 198 through the movement of change-over lever 74. Thus, friction wheel 73 is prevented from contacting reel mount 64 so that the reel mount also does not rotate.

In addition, in the pause mode change-over switch 124 is placed in the reproducing state by pause lever 101 through recording slide 105 and reproducing slide 106 and pause switch 225 is pushed by pin 104 of the pause lever 101.

Next, the cue mode of operation will be described with reference to FIG. 28. The cue mode is established by depressing pause push-button 12 while the recorder is in the fast forward mode illustrated in FIG. 20. That is, the cue mode is the combination of the fast forward mode and the independent pause mode.

Figure 28:
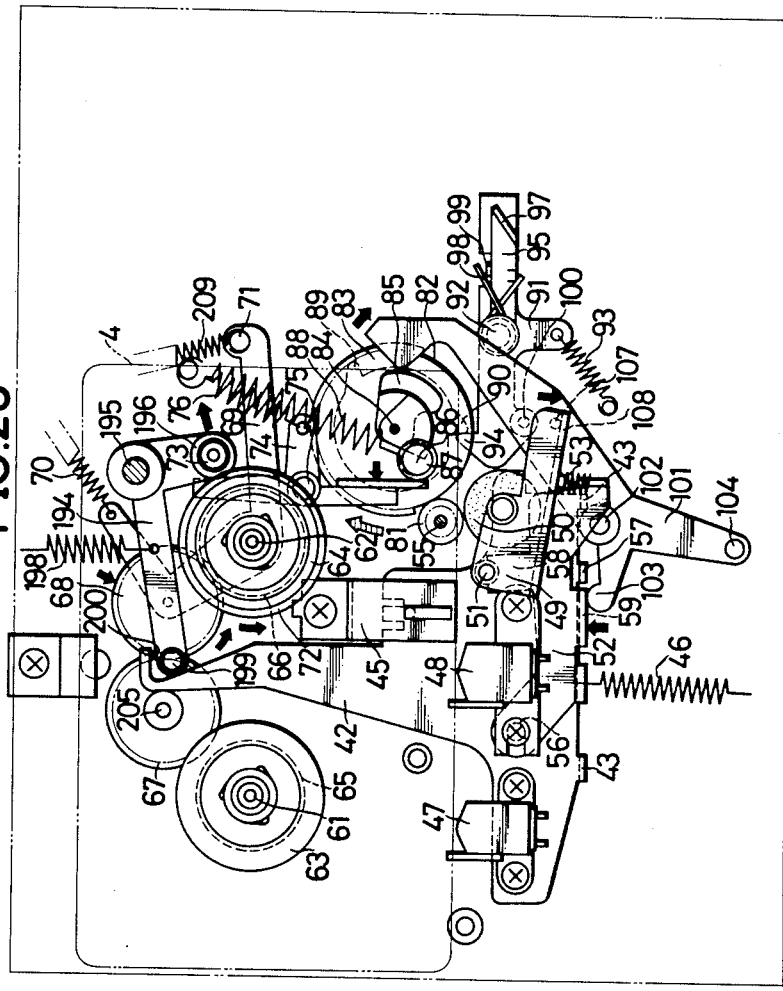
FIG. 28 is a front view of the tape recorder showing the cue mode of operation.

When pause button 12 is pushed while the recorder is in the fast forward mode of operation, pause trigger lever 91 rotates counter-clockwise as viewed in FIG. 28 around pin 92 under the urging of sub-trigger lever 95. Hook portion 94 is thereby disengaged from stop portion 89 of pause gear 83 releasing pause gear 83 to be driven by drive gear 81. Accordingly, pause lever 101 is pushed by cam 85 and is rotated clockwise as viewed in FIG. 28 around pin 102. Responsive to the rotation of pause lever 101 head chassis assembly 42 is displaced forwardly to its intermediate position where erasing head 47 and reproducing head 48 slightly contact the magnetic tape in the tape cassette. Further, pinch roller lever 49 contacts pin 107 on pause lever 101 to prevent lever 49 from rotating thereby separating pinch roller 50 from capstan 55. In addition, supporting lever 194 is prevented from rotating by change-over lever 74, which is pushed by roller 87 of pause gear 83, and, hence, friction wheel 73 is separated from the reel mount 64. Accordingly, the magnetic tape runs at a relatively high speed slightly contacting the recording-reproducing magnetic head 48 to establish the cue mode of operation.

In this cue mode, change-over switch 124 is placed in the reproducing state, play detecting switch 110 is opened and pause switch 225 is pushed and turned on. As play detecting switch 110 is turned off, the out-put signal of the line amplifier is cut-off, as mentioned above. Further, as switch 110 is turned off the base voltage of transistor 270 is maintained at the lower level. Accordingly, transistor 270 is turned off and, hence, the connecting point 271 of the signal line of line amplifier 263 is not connected to the ground through transistor 270. Thus, the output of line amplifier 263 is applied to detecting amplifier 272. Since a resistor 273 is connected between connecting points 264 and 271, the output signal can be picked up from connecting point 271 even though connecting point 264 is connected to the ground.

Figure 36:
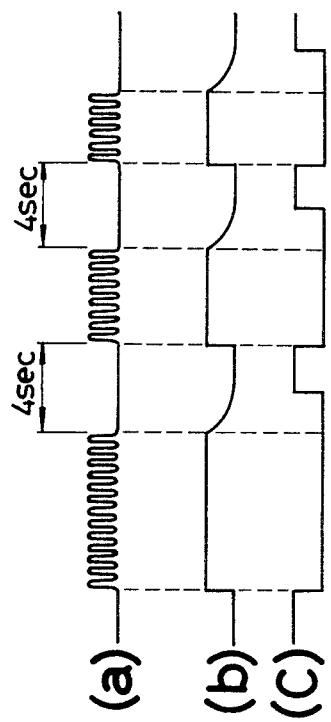
FIG. 36a, b and c are wave forms of the reproduced signal, the voltage of the condenser and the voltage of the collector of the transistor, respectively.

With this feature, the need to provide a searching head to search for any partition signals (soundless portions) which are inserted between, for example the recorded music, is obviated. The output signal of line amplifier 263 is amplified and limited by detecting amplifier 272. The reason for limiting the signal is to obtain the same operating time in spite of the amplitude variation of the reproduced signal reproduced by magnetic head 48. When the music signal is reproduced, condenser 275 of rectifier circuit (274) (FIG. 35) is charged as shown in FIG. 36. Therefore, transistor 276 is opened and transistor 277 is closed. Transistors 276 and 277 are connected to form a Schmitt circuit 278. When magnetic head 48 contacts a no-signal portion between recorded signals on the magnetic tape, the charge of condenser 275 is discharged through resistor 279. When the interval between recorded signals is selected to be a suitable time length, for example 3 or 4 seconds at the predetermined constant speed of the running tape, and when the time constant of condenser 275 and resistor 279 is selected to be a suitable time length, for example 2 seconds, then condenser 275 is charged on the reproducing of the signal portion of the magnetic tape and condenser 275 is discharged and transistor 276 of Schmitt circuit 278 is turned on when a no-signal portion or a separation in the signal portion of the magnetic tape is sensed. With this operation of transistor 276, condenser 280 generates a positive pulse which is supplied to the base of transistor 258 so that plunger 167 is deenergized for a moment and the tape recorder is changed over to the stop mode.

Figure 29:
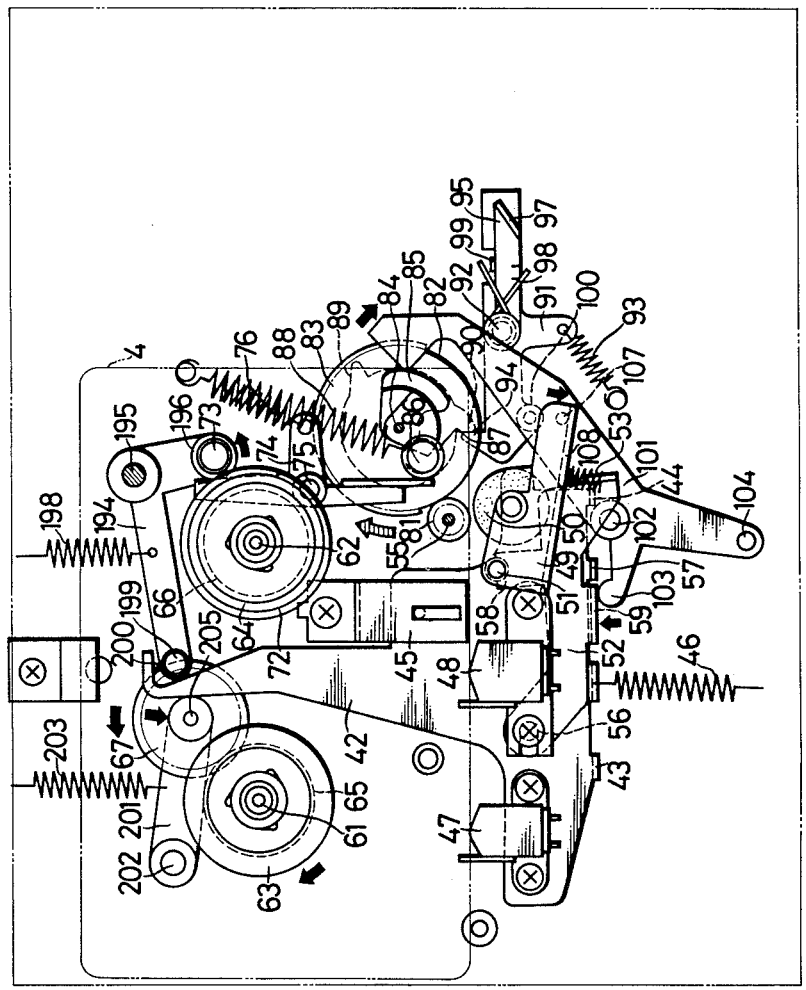
FIG. 29 is a front view of the tape recorder showing the review mode of operation.

Next, the review mode of operation will be described with reference to FIG. 29. The review mode is established by depressing pause push-button 12 when the recorder is in the rewind mode illustrated in FIG. 22. That is, the review mode is the combination of the pause operation and the rewind operation.

When pause push-button 12 is depressed with the recorder in the rewind mode, pause trigger lever 91 is rotated and the lock of pause gear 83 is released. With this movement, pause gear 83 rotates to rotate pause lever 101. Therefore, head chassis assembly 42 moves forward to its intermediate position and erasing head 47 and recording-reproducing head 48 slightly contact the magnetic tape in the tape cassette. Pinch roller 50 is prevented from contacting capstan 55 through pin 107 on pause lever 101 and friction wheel 73 is prevented from contacting reel mount 64 by change-over lever 74. Thus, the magnetic tape is rewound at a relatively high speed in slight contact with the recording-reproducing head 48 to establish the review mode of operation.

In the review mode the tape recorder is changed over to the stop mode responsive to the detecting of separation between signals on the tape in the same manner as in the cue mode.

Next, the manual and continuous operation to change the tape recorder from one mode to the other mode will be described with reference to FIGS. 30 and 31.

As mentioned above, pin 161 is locked by lock plate 173 to maintain operating lever 160 in an active position and play gear 135 is locked by trigger lever 142 through hook 143 and stop portion 141 in the reproducing, recording, fast-forward, rewind, cue and review modes.

Figure 30:
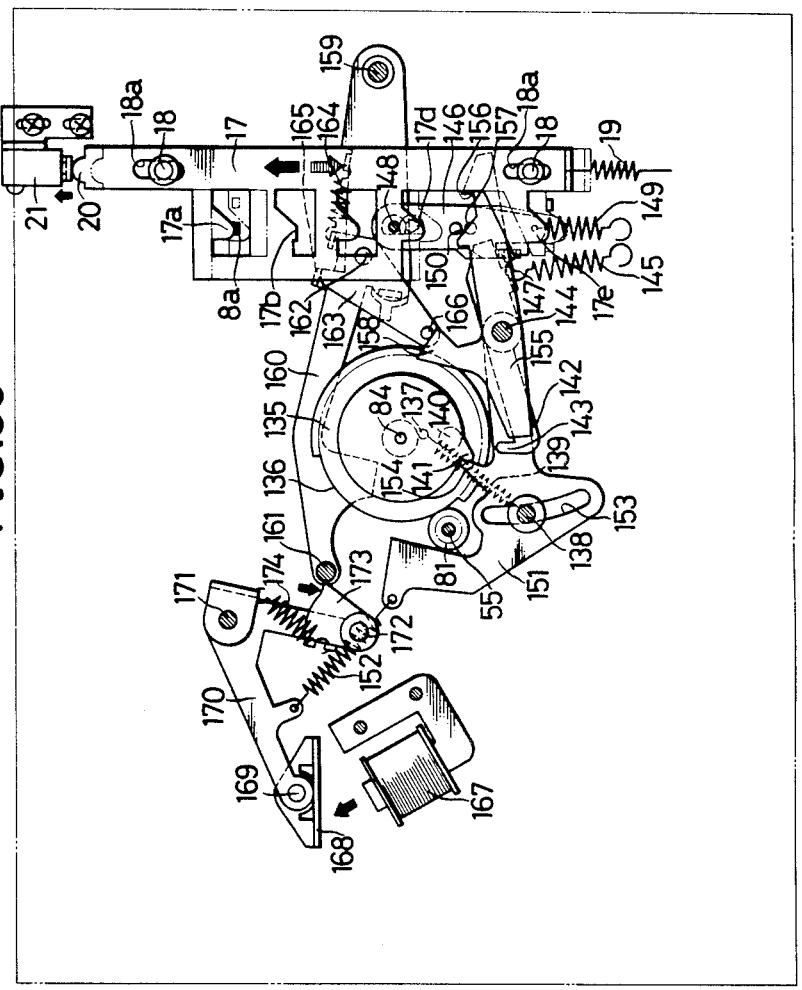
FIG. 30 and FIG. 31 are front views of important parts of the tape recorder showing the manual continuous operation from one mode to the other mode.

When another push-button is depressed while the recorder is in any of these modes, for example if the rewind push-button 8 is depressed with the recorder in the reproducing mode (in this mode, the reproducing push-button is maintained in its depressed position), L-shaped lever 8a associated with push-button 8 rotates and the top of lever 8a goes over lock portion 17a of locking plate 17 thereby displacing locking plate 17 upwardly as viewed in FIG. 30. Connecting lever 146 is also displaced upwardly. With this movement trigger lever 142 rotates counter-clockwise as viewed in FIG. 30 around pin 144 and hook 143 is disengaged from stop portion 141 of play gear 135. Hence, play gear 135 rotates clockwise through a small angle under the urging of coil spring 139. After this slight rotation, stop portion 141 of play gear 135 engages with hook portion 154 of trigger timing lever 151 and gear 135 stops rotating because trigger timing lever 151 is in the active position as shown in FIG. 30 at this stage.

In addition, with the displacement of locking plate 17 switch 21 is pushed and plunger 167 is deenergized. Hence, lock lever 170 rotates clockwise as viewed in FIG. 30 around pin 171 and the lock of operating lever 160 is released to allow operating lever 160 to rotate reset plate 163 and reset lever 155. Reset lever 155 rotates counter-clockwise as viewed in FIG. 30 and the rotation of reset lever 155 is transmitted to locking plate 27 through connecting lever 146 and locking lever 17 is displaced upwardly as viewed in FIG. 31 once again to release the lock of the operating push-button, for example the reproducing push-button. In this stage, rewind push-button 8 is maintained in its depressed position by the finger of the operator and, hence, the lock of push-button 8 is not released.

As soon as lock plate 17 clears reproducing push-button 10, lock plate 17 is restored to its original position by coil spring 19 and, in the restored position, locking plate 17 locks L-shaped lever 8a associated with rewind push-button 8.

Figure 31:
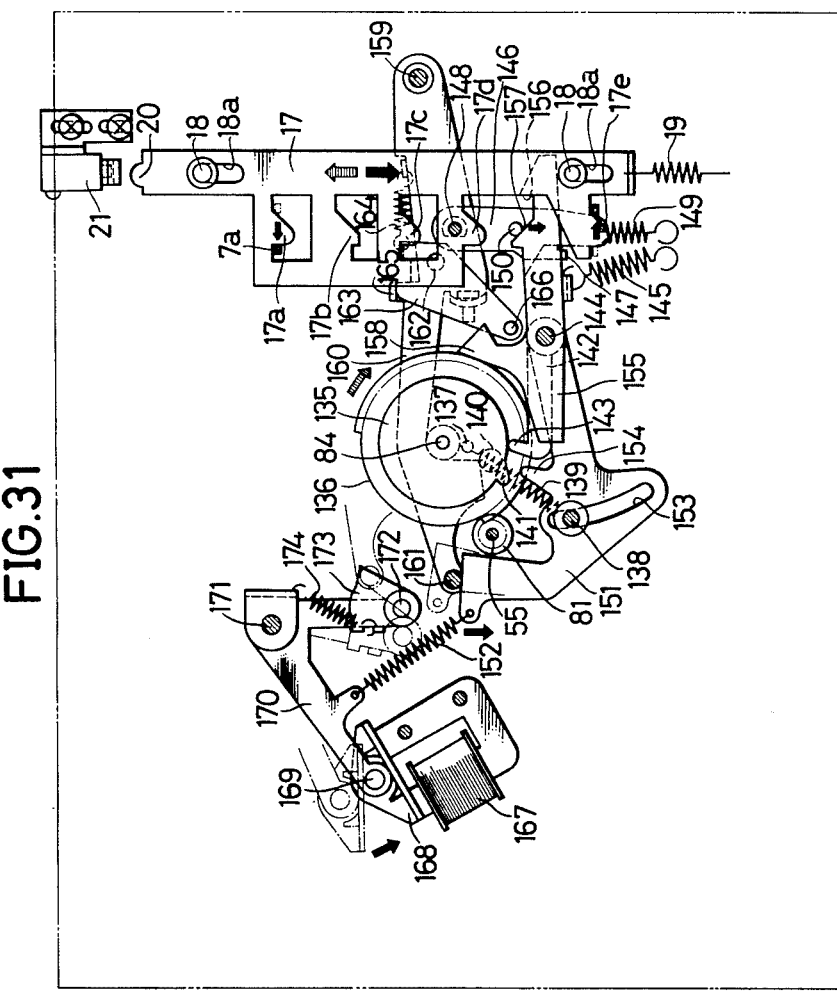

Responsive to the further counter-clockwise rotation of operating lever 160, pin 161 of lever 160 pushes trigger timing lever 151 rotating it counter-clockwise as viewed in FIG. 31 around pin 144. This disengages hook 154 of lever 151 from stop portion 141 of play gear 135 allowing play gear 135 to rotate initially under the urging of coil spring 139 and next driven by pinion 81. Therefore, operating lever 160 rotates and the tape recorder is changed over to the rewind mode of operation due to the cooperation of the selecting apparatus which is associated with rewind push-button 8.

Next, the reproducing-stop-reproducing operation will be described with reference to FIGS. 32 to 34. This operation is one where the recorder is changed over from the reproducing mode to the stop mode and then back to the reproducing mode automatically.

When reproducing-reproducing push-button 9 is depressed, L-shaped lever 9a rotates against the urging force of coil spring 9b, and the top of lever 9a goes over lock portion 17b of locking plate 17 and is received in the pocket corresponding to the lock portion 17b. As soon as the top of the lever 9a goes over lock portion 17b, locking plate 17 returns to its original position. However, the return stroke of the return movement of locking plate 17 is very small because the pocket corresponding to lock portion 17b is shallow. Thus, lock plate 17 locks lever 9a in an intermediate position.

Figure 32:
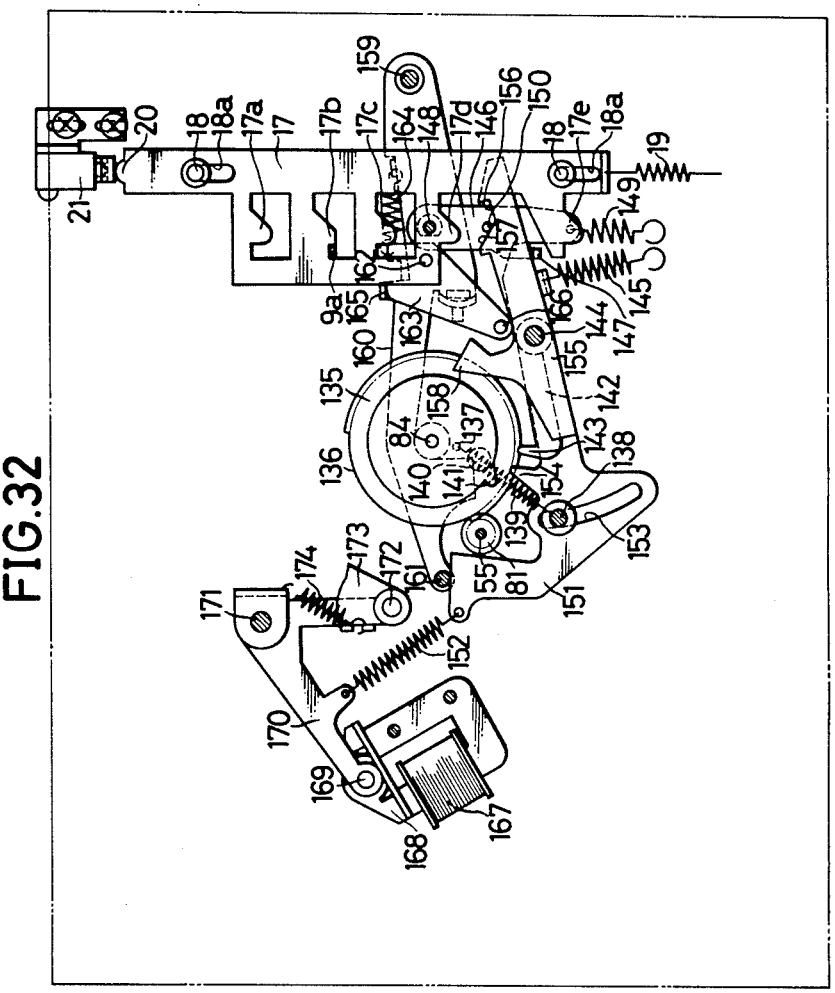
FIG. 32, FIG. 33 and FIG. 34 are front views of important parts of the tape recorder showing the continuous operations from the reproducing mode to the stop mode, and to the reproducing mode.

Responsive to the upward displacement of locking plate 17 as viewed in FIG. 32 to lock push-button 9, trigger lever 142 rotates clockwise as viewed in FIG. 32 around pin 144 through connecting lever 146 thereby disengaging hook 143 of trigger lever 142 from stop portion 141 of play gear 135. Play gear 135 rotates initially due to the urging force coil spring 139 and is then driven by pinion 81. This rotates operating lever 160 and head chassis assembly 42 is displaced forward through operating slide 175 in the same manner as described in the reproducing mode of operation. Thus the magnetic tape runs at the predetermined constant speed contacting magnetic heads 47 and 48 and the tape is wound on the reel driven by friction wheel 73. In this manner the reproducing mode of operation is established.

Figure 33:
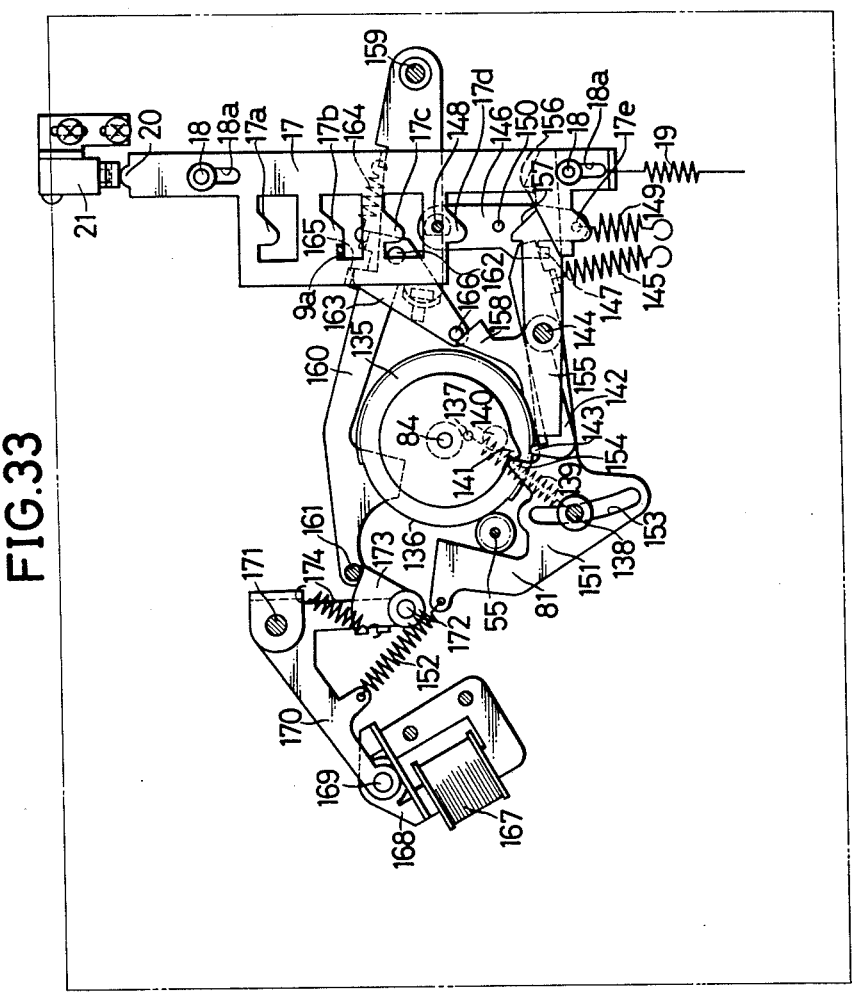

In this stage, locking plate 17 maintains reproducing-reproducing push-button 9 in its depressed position and locking plate 17 itself is in its intermediate position as shown in FIG. 33. Therefore connecting lever 146 is also in an intermediate position and bent tab 147 of lever 146 maintains trigger lever 142 in its counter-clockwise rotated position around pin 144 against the urging force of coil spring 145. Hence lever 142 is not engaged with play gear 135 which has already been rotated through one cycle of operation by one revolution. At this juncture, stop portion 141 of play gear 135 engages hook 154 of trigger timing lever 151 and, therefore, play gear 135 is prevented from rotation.

The tape recorder is changed over to the stop mode and then to the reproducing mode automatically from the reproducing mode when a stop signal is supplied with the recorder in this condition. That is plunger 167 is deenergized for a moment when a tape end detecting signal is received. Hence lock lever 170 rotates clockwise as viewed in FIG. 34 around pin 171 and lock plate 173 is disengaged from pin 161. With this movement operating lever 160 rotates counter-clockwise as viewed in FIG. 34 around pin 159 and pin 166 of reset plate 163 supported by the operating lever 160 pushes reset lever 155 to rotate lever 155 counter-clockwise as viewed in FIG. 34 around pin 144. As a result, locking plate 17 is pushed upwardly as viewed in FIG. 34 by connecting lever 146. Hence the lock of reproducing-reproducing push-button 10 or the associated lever 10a is released.

Figure 34:
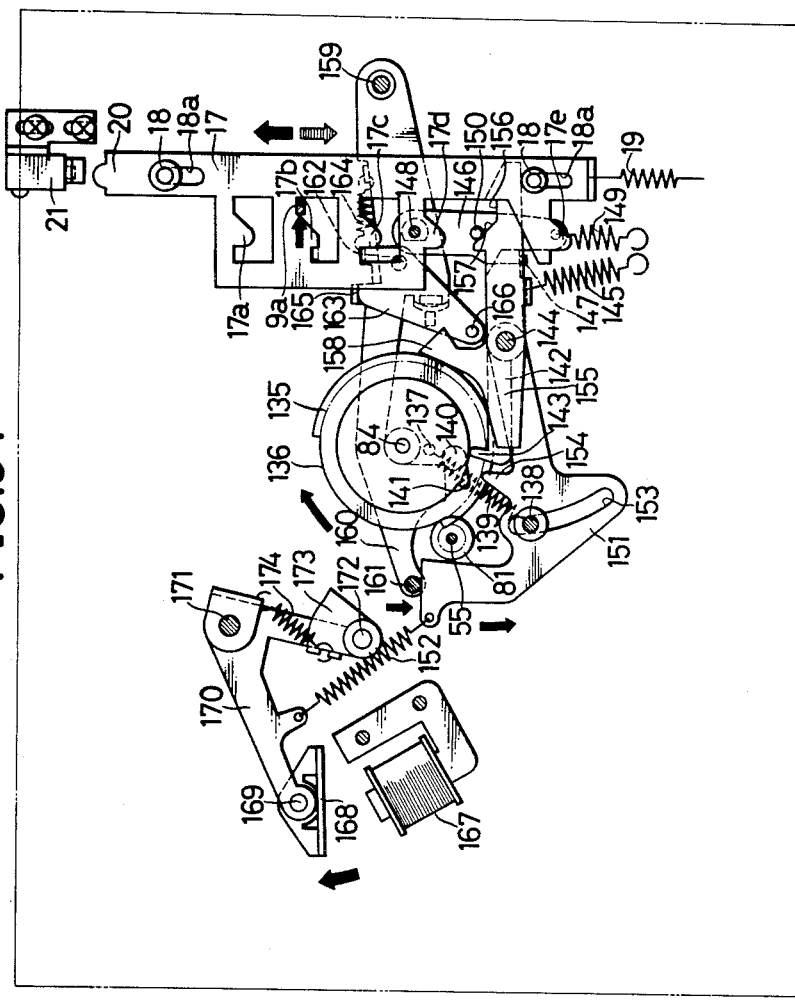

In accordance with the further rotation of operating lever 160, pin 161 on lever 160 pushes the top of trigger timing lever 151 rotating it counter-clockwise as viewed in FIG. 34 around pin 144 against the urging force of coil spring 152 thus releasing the engagement of hook 154 of lever 151 and stop portion 141 of play gear 135. Play gear 135 now rotates initially due to the urging force of coil spring 139 and then is driven by pinion 81. With the rotation of play gear 135 the operating lever 160 and operating slide 175 rotate forward. At this stage, locking plate 17 is displaced in its upward position without locking any of the operating push-buttons and, therefore, the mode selecting device is in an inactive state. Accordingly, the tape recorder is automatically changed over again to the reproducing mode of operation due to the forward displacement of operating slide 175. In this manner the reproducing-stop-reproducing operation is performed.

The above described reproducing-stop-reproducing operation is not useful by itself nor does it give the tape recorder any actual advantages. However, this operation is advantageous when the operation is combined with either the cue mode or review mode. In combination with any of these other modes the tape recorder performs an automatic play operation in accordance with the detecting of the separation between signals on the tape or other control signals.

That is, the reproducing-reproducing push-button 9 or the associated lever 9a is further locked by the locking plate 17 in the cue mode (FIG. 28) or in the review mode (FIG. 29) while locking plate 17 is maintained in its intermediate position. Then connecting lever 146 pulls trigger lever 142 through connecting lever 146 to rotate lever 142 counter-clockwise around pin 144 as shown in FIG. 32. Accordingly, stop portion 141 of play gear 135 is not engaged with trigger lever 142 but stop portion 141 is engaged with hook portion 154 of trigger timing lever 151.

In this state, the cue mode of operation of the review mode of operation is obtained. When the drive circuit of plunger 167 is driven by the signal from the counter the separation of recorded material on the tape or any other control signal is sensed and plunger 167 is deenergized for a moment. Then, the lock of operating lever 160 is released and pin 161 of lever 160 pushes trigger timing lever 151 to release the lock of play gear 135. Play gear 135 rotates one cycle or one revolution and responsive to the rotation of play gear 135 operating lever 160 rotates forward and the tape recorder is changed over to the reproducing mode. That is, when the control signal is supplied the tape recorder is automatically changed over to the reproducing mode from the cue mode or the review mode.

Although an illustrative embodiment of this invention has been described in detail herein with reference to the accompanying drawings, it is to be understood that the invention is not limited to the precise embodiment, and that various changes and modifications may be effected therein by one skilled in the art without departing from the scope or spirit of the invention as defined in the appended claims.

What is claimed is:

1. A tape recording and/or reproducing apparatus comprising:
   a push-button assembly including a plurality of push-button members for selectively placing said apparatus into a selected one of a plurality of operating modes,
   a head assembly including at least a recording and/or reproducing head, movable from a first inactive position through an intermediate position to a second active position in close juxtaposition to a magnetic tape which is adapted to have information signals reproduced from or recorded on the tape by said head,
   a tape drive assembly including a pinch roller and tape drive capstan for selectively driving the tape at a predetermined speed for tape recording or reproducing and at a higher speed for winding the tape when no recording or reproducing function occurs,
   a first operating gear operatively associated with at least one of said plurality of push-button members through a first trigger means wherein said first trigger means responds upon selective activation of said one push-button member,
   a first operating member operatively associated with said first operating gear movable from a first inactive state to a second active state for placing said tape drive assembly into an active state to drive tape at one of said tape drive speeds,
   a second operating gear operatively associated with at least another of said push-button members through a second trigger means wherein said second trigger means responds upon selective activation of said other push-button member, and
   a second operating member operatively associated with said second operating gear movable from a first inactive state to a second active state for placing said head assembly into said intermediate position relative to the path of running of said tape.

2. A tape recording and/or reproducing apparatus according to claim 1 wherein said second operating member is further associated with said tape drive assembly to place said drive assembly into its first inactive position whereby said second operating member precludes driving said tape.

3. A tape recording and/or reproducing apparatus according to claim 2 wherein said second operating member is provided with an actuating portion to actuate a pinch roller lever to separate said pinch roller from said capstan whereby said tape is precluded from being driven by said tape drive assembly.

4. A tape recording and/or reproducing apparatus according to claim 1 wherein said first operating member and said second operating member are actuated independent from each other whereby said apparatus is changed over to a first mode of operation responsive to the operation of said first operating member, and the apparatus is changed over to a second mode of operation in accordance with the operation of said second operating member, and wherein said apparatus is changed over to a third mode of operation responsive to the operation of both said first and second operating members.

5. A tape recording and/or reproducing apparatus according to claim 4 wherein said apparatus further includes resetting means associated with said first operating member and wherein said resetting means operates to release the operation of said second operating member in response to a restoring movement of said first operating member when said apparatus is in said third mode of the operation.

6. A tape recording and/or reproducing apparatus according to claim 5 wherein said second operating gear includes first and second stop portions adapted to engage said second trigger means and wherein the distance from said first stop portion to the center of said second operating gear is greater than the distance from said second stop portion to the center of said second operating gear, and wherein said first stop portion engages said second trigger means when said second operating member is in its inactive state and wherein said second stop portion engages with said second trigger means when said second operating member is in its active state whereby said second trigger means engaged with said first stop portion is shifted from said second trigger means engaged with said second stop portion and said second trigger means is actuated by said resetting means only when said second trigger means is engaged with said second stop portion to release said second operating member from its active state to its inactive state.

7. A tape recording and/or reproducing apparatus according to claim 1 wherein said first operating gear includes a stop portion thereon selectively engageable by said first trigger means and wherein said first trigger means comprises first and second trigger members, said first and second trigger members being selectively actuable to engage said first operating gear stop portion, said first trigger member being operatively associated with at least said one push-button member such that said first trigger member is separated from engagement with said first operating gear stop portion responsive to the actuation of said one push-button, and said second trigger member is operatively associated with said first operating member such that said second trigger member is displaced from a first position engaged with said first operating gear stop portion to a second position disengaged from said first operating gear stop portion when said first operating member is restored to its inactive state.

8. A tape recording and/or reproducing apparatus according to claim 1 wherein said apparatus further includes a solenoid-plunger means to lock said first operating member in its active state when said solenoid-plunger is energized.

9. A tape recording and/or reproducing apparatus according to claim 8 wherein said apparatus further includes switching means associated with another of said push-button members which operates as a stop push-button and wherein said switching means is electrically connected to said solenoid-plunger such that said solenoid-plunger is deenergized by said switching means responsive to the actuation of said stop push-button.

10. A tape recording and/or reproducing apparatus according to claim 9 wherein said apparatus further includes a locking plate movable from a first position to a second position to lock said one push-button member and wherein said locking plate includes an actuating portion to actuate said switching means responsive to the displacement of said locking plate when it is moved from said first position to said second position.

11. A tape recording and/or reproducing apparatus according to claim 10 wherein said apparatus further includes resetting means associated with said first operating member such that said resetting means resets said locking plate from said second position to said first position to release the lock of said one push-button responsive to the restoring movement of said first operating member to its inactive position.

12. A tape recording and/or reproducing apparatus according to claim 11 wherein said apparatus further includes a connecting lever connected to said locking plate having a bent tab member engageable with said first trigger means to release the engagement of said first trigger means from said first operating gear and wherein said connecting lever is moved responsive to movement of said resetting means to displace said locking plate from said second position to said first position to release the lock of said one push-button without affecting said trigger means.

13. A tape recording and/or reproducing apparatus according to claim 10 wherein said first operating gear include a stop portion thereon selectively engageable by said first trigger means and wherein said first trigger means includes first and second trigger members with said first trigger member being operatively associated with said locking plate through a connecting member such that said first trigger member is separated from said stop portion of said first operating gear responsive to the displacement of said locking plate and said second trigger member is operatively associated with said first operating member such that said second trigger member is displaced to an inactive position where said second trigger member is not engaged with said stop portion of said first operating gear when said first operating member is moved to its inactive state.

14. A tape recording and/or reproducing apparatus according to claim 13 wherein said push-button assembly includes a reproducing-reproducing push-button and said locking plate includes pocket portions defined in said locking plate to selectively lock selected ones of said push-button members and wherein one of said pocket portions corresponding to said reproducing-reproducing push-button is shallower than the other of said pockets of said locking plate corresponding to said other operating push-button members whereby the restoring stroke of said locking plate in its movement from said second position to said first position is less when said reproducing-reproducing push-button member is locked by said locking plate than the stroke when any of said other operating push-button members is locked whereby said first trigger member is separated from engagement with said stop portion of said first operating gear when said locking plate moves from said first position to its second position when locking said reproducing-reproducing push-button member.

15. A tape recording and/or reproducing apparatus according to claim 8 wherein said apparatus further includes means to generate a control signal and said signal generating means is electrically connected to the electrical drive circuit for said solenoid-plunger whereby said solenoid-plunger is deenergized when said control signal is supplied to said drive circuit.

16. A tape recording and/or reproducing apparatus comprising:
- a push-button assembly including a plurality of push-button members for selectively placing said apparatus into a selected one of a plurality of operating modes, and including at least rewind and fast forward push-buttons.
- a head assembly including at least a recording and/or reproducing head movable from a first inactive position through an intermediate position to a second active position in contact with a magnetic tape which is wound on two reels.
- first tape drive means for driving one of said reels to wind said tape at a predetermined speed for tape recording or reproducing, second tape drive means for winding said tape on one of said reels at a higher speed than said predetermined speed, a first operating gear, first trigger means responsive to selective activation of said rewind push-button and said fast forward push-button, for operatively associating said first operating gear therewith, a first operating member operatively associated with said first operating gear and being movable from a first inactive state to a second active state for placing said second tape drive assembly into an active state to drive said tape at said higher speed, a second operating gear second trigger means responsive to selective activation of another of said push-button members, for operatively associating said second operating gear therewith, a second operating member operatively associated with said second operating gear and being movable from a first inactive state to a second active state for placing said head assembly into said intermediate position relative to the path of running of said tape, and means for disengaging said first tape drive means from the respective one of said reels and for placing said head assembly into said intermediate position.

* * * * *